(12) United States Patent
Heggebø

(10) Patent No.: US 12,703,569 B2
(45) Date of Patent: Aug. 11, 2026

(54) AUTOMATED STORAGE AND RETRIEVAL SYSTEM COMPRISING A TRANSFER COLUMN WITH SIDE OPENING WITH BLOCKER AND METHOD OF OPERATING BLOCKER

(71) Applicant: Autostore Technology AS, Nedre Vats (NO)

(72) Inventor: Jørgen Djuve Heggebø, Langhus (NO)

(73) Assignee: AutoStore Technology AS, Nedre Vats (NO)

( * ) Notice: Subject to any disclaimer, the term of this patent is extended or adjusted under 35 U.S.C. 154(b) by 355 days.

(21) Appl. No.: 18/556,305

(22) PCT Filed: May 16, 2022

(86) PCT No.: PCT/EP2022/063126
§ 371 (c)(1),
(2) Date: Oct. 19, 2023

(87) PCT Pub. No.: WO2022/243215
PCT Pub. Date: Nov. 24, 2022

(65) Prior Publication Data
US 2024/0182241 A1 Jun. 6, 2024

(30) Foreign Application Priority Data
May 21, 2021 (NO) .................................... 20210629

(51) Int. Cl.
*B65G 1/04* (2006.01)

(52) U.S. Cl.
CPC .... *B65G 1/0464* (2013.01); *B65G 2201/0258* (2013.01)

(58) Field of Classification Search
CPC ...................... B65G 1/0464; B65G 2201/0258
See application file for complete search history.

(56) References Cited

U.S. PATENT DOCUMENTS 4,088,232 A * 5/1978 Lilly .................... B65G 1/0464 414/282
10,336,540 B2 * 7/2019 Gravelle .............. B65G 1/0464
(Continued)

FOREIGN PATENT DOCUMENTS

CN 112208991 A 1/2021
JP 2002096916 A 4/2002
(Continued)

OTHER PUBLICATIONS

Palais, Brieux, Communication of Intent to Grant in European patent application EP22 729 525.0, dated Dec. 12, 2024, 71 pages, pub. by European Patent Office, Rijswijk, Netherlands.
(Continued)

*Primary Examiner* — James Keenan
(74) *Attorney, Agent, or Firm* — Baker Botts L.L.P.

(57) ABSTRACT

An automated storage and retrieval system includes a two-dimensional rail system including a first set of parallel rails arranged to guide movement of container handling vehicles in a first direction across the top of a framework structure, and a second set of parallel rails arranged perpendicular to the first set of rails to guide movement of the container handling vehicles in a second direction across the top of the framework structure which is perpendicular to the first direction. A number of container handling vehicles operate on the rail system for storing and retrieving goods holders in the automated storage and retrieval system. The framework structure includes a transfer column and an adjustable blocker. The transfer column includes a side opening for a goods holder to pass through. The adjustable blocker is for obstructing the side opening. The blocker includes a guiding surface for guiding a lifting device of the container handling vehicle vertically in the transfer column past the side opening. The blocker is movable between: a first position, where the guiding surface is positioned to guide the lifting device
(Continued)

vertically and obstruct horizontal movement of a goods holder through the side opening, and a second position, where the guiding surface is positioned not to guide the lifting device and where the blocker is positioned to allow horizontal movement of a goods holder through the side opening.

27 Claims, 29 Drawing Sheets

(56) References Cited

U.S. PATENT DOCUMENTS

2003/0228208 A1* 12/2003 Grond .................. B65G 1/0471 414/277
2021/0053777 A1 2/2021 Harting et al.

FOREIGN PATENT DOCUMENTS

| | | | |
|---|---|---|---|
| NO | 317366 | B1 | 10/2004 |
| NO | 346714 | A | 12/2022 |
| WO | 2014075937 | A1 | 5/2014 |
| WO | 2014090684 | A1 | 6/2014 |
| WO | 2014/195901 | A1 | 12/2014 |
| WO | 2014/203126 | A1 | 12/2014 |
| WO | 2015193278 | A1 | 12/2015 |
| WO | 2018146304 | A1 | 8/2018 |
| WO | 2019206487 | A1 | 10/2019 |
| WO | 2019/238639 | A1 | 12/2019 |
| WO | 2019/238694 | A1 | 12/2019 |
| WO | 2019/238697 | A1 | 12/2019 |
| WO | 2020/200631 | A1 | 10/2020 |

OTHER PUBLICATIONS

Palais, Brieux, Communication of Intent to Grant in European patent application EP22729525.0, dated Mar. 19, 2025, 71 pages, pub. by European Patent Office, Rijswijk, Netherlands.
International Search Report issued in PCT/EP2022/063126 on Sep. 14, 2022 (4 pages).
Written Opinion of the International Searching Authority issued in PCT/EP2022/063126 on Sep. 14, 2022 (8 pages).
Norwegian Search Report issued in No. 20210629 mailed on Dec. 21, 2021 (2 pages).
Huang, Jing, Examining action in Chinese patent application 202280032335.4, mailed Nov. 21, 2025, 11 pages, pub. by The State Intellectual Property Office of the People's Republic of China, Beijing, China.

* cited by examiner

AUTOMATED STORAGE AND RETRIEVAL SYSTEM COMPRISING A TRANSFER COLUMN WITH SIDE OPENING WITH BLOCKER AND METHOD OF OPERATING BLOCKER

FIELD OF THE INVENTION

FIG. 1 discloses a prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301,401 comprises a vehicle body 201*a*,301*a*,401*a* and first and second sets of wheels 201*b*, 201*c*, 301*b*, 301*c*,401*b*,401*c* which enable the lateral movement of the container handling vehicles 201,301,401 in the X direction and in the Y direction, respectively. In FIGS. 2, 3 and 4 two wheels in each set are fully visible. The first set of wheels 201*b*,301*b*, 401*b* is arranged to engage with two adjacent rails of the first set 110 of rails, and the second set of wheels 201*c*,301*c*,401*c* is arranged to engage with two adjacent rails of the second set 111 of rails. At least one of the sets of wheels 201*b*, 201*c*, 301*b*,301*c*,401*b*,401*c* can be lifted and lowered, so that the first set of wheels 201*b*,301*b*,401*b* and/or the second set of wheels 201*c*,301*c*,401*c* can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal to the first direction X and the second direction Y. Parts of the gripping device of the container handling vehicles 301,401 are shown in FIGS. 3 and 4 indicated with reference number 304,404. The gripping device of the container handling device 201 is located within the vehicle body 201*a* in FIG. 2.

Conventionally, and also for the purpose of this application, Z=1 identifies the uppermost layer available for storage containers below the rails 110,111, i.e. the layer immediately below the rail system 108, Z=2 the second layer below the rail system 108, Z=3 the third layer etc. In the exemplary prior art disclosed in FIG. 1, Z=7 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=5. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201*a* as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail 110,111 may comprise two parallel tracks. In other rail systems 108, each rail in one direction may comprise one track and each rail in the other perpendicular direction may comprise two tracks. Each rail 110,111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

When travelling up and down transfer columns, the lifting devices of the container handling vehicles operating on the rail system require guiding in order to travel firmly and avoid getting stuck or jammed in between the upright members of the framework structure. Possible problems relating to uneven lifting of the lifting devices increase by distance between the container handling vehicle and the lifting device.

A desire for the possibility of transferring storage containers horizontally through a side opening of a transfer column has developed. It is therefore an objective of the invention to provide a solution solving the above stated problem. In particular, it is an objective of the invention to provide a system and method which both allows horizontal movement of a storage container through a side opening of the transfer column and also provides the possibility of guiding lifting devices travelling over the side opening.

SUMMARY OF THE INVENTION

The present invention is set forth and characterized in the independent claims, while the dependent claims describe other characteristics of the invention.

Compared to the prior art solutions, the system according to the invention does not stack the storage containers physically on top of each other. Instead, the goods holders, such as e.g. storage containers or other goods supporting elements, can be stored on independent storage positions such as shelves. This different method compared to the prior art solutions has a technical advantage of avoiding digging e.g. for storage containers that require high frequency access and/or for part-consolidated orders. However, in order to achieve this, a goods holder can be fed into a storage position from the side, i.e. horizontally, compared to only being fed from top as in the prior art solutions.

The invention relates to an automated storage and retrieval system comprising a two-dimensional rail system comprising a first set of parallel rails arranged to guide movement of container handling vehicles in a first direction across the top of a framework structure, and a second set of parallel rails arranged perpendicular to the first set of rails to guide movement of the container handling vehicles in a second direction across the top of the framework structure which is perpendicular to the first direction, wherein a number of container handling vehicles operate on the rail system for storing and retrieving goods holders in the automated storage and retrieval system, and wherein the framework structure comprises:

- a transfer column comprising a side opening for a goods holder to pass through,
- an adjustable blocker for obstructing the side opening, the blocker comprising a guiding surface for guiding a lifting device of the container handling vehicle vertically in the transfer column past the side opening, wherein the blocker is movable between:
  - a first position, where the guiding surface is positioned to guide the lifting device vertically and obstruct horizontal movement of a goods holder through the side opening, and
  - a second position, where the guiding surface is positioned not to guide the lifting device and where the blocker is positioned to allow horizontal movement of a goods holder through the side opening.

The goods holder may be a storage container. Alternatively, the goods holder can be a bin, a tote, a pallet, a tray or similar. Different types of goods holders may be used in the same system.

The framework structure at the position of the side opening may need to be re-configured if it is to provide a side opening with sufficient size for transferring a goods holder therethrough. A result of increasing the height of the side opening is that the lifting device of a container handling vehicle may be no longer guided by the framework structure because the size of the lifting device is smaller than the distance between the material of the upright members. The system solves the problem by allowing horizontal movement of a goods holder through a side opening of the transfer column or guiding of the lifting device as it travels vertically past the side opening.

In other words, the adjustable blocker may be configured such that:

- when in the first position, a route through the side opening is blocked and the guiding surface is positioned to guide the lifting device moving in a vertical direction past the guiding surface, and
- when in the second position, a route through the side opening is unblocked allowing horizontal movement of a goods holder through the side opening. Thus, in the first position, the guiding surface is in a guiding position and in the second position, the guiding surface is in a non-guiding position.

The blocker may be motorized, such as a motorized actuator or alternatively spring-loaded or otherwise configured to return to the first position after being forced into the second position.

The lifting device may be larger in all directions in the horizontal plane than the goods holders and the lifting device may be guided by the upright members of the framework structure at those parts of the transfer column not having a side opening. The goods holder may also be guided if carried by the lifting device.

The side opening may open towards an adjacent column.

The framework structure comprises upright members delimiting the horizontal extent of the transfer column. In a preferred embodiment, the transfer column is delimited by four upright members, where one upright member is arranged in each corner forming a rectangular or square shaped cross section for the transfer column. I.e., the maximum horizontal extent of the transfer column is defined by the upright members.

The framework structure may further comprise horizontal members, and the upright members and horizontal members may form a rectangular frame defining a cross sectional area of the side opening.

The adjacent column may comprise a plurality of vertically spaced storage positions comprising supports for supporting goods holders. Preferably the goods holders are supported from below in the storage positions. However, it is also possible that the goods holders are hung off e.g. on a frame or support at each storage position.

The storage positions may be adjustable through movement of the support(s) between a position where they are configured to support a goods holder and a position where a goods holder is allowed to pass vertically through the storage position.

The storage position may be configured with similar additional side openings as the side opening towards the transfer column. There may be arranged additional side openings on one, two or three of the other four sides. This render possible that a goods holder can be retrieved and inserted horizontally or sideways into the storage position. This possibility may further be advantageous if the storage position is at the edge of the automated storage and retrieval system such that a robotic operator or human operator can retrieve or insert the goods holder from a position outside the automated storage and retrieval system.

The blocker may comprise a pair of first and second obstruction members arranged at opposite edges of the side opening, where a pivot axis of each of the first and second obstruction members may extend vertically, and where the obstruction members may be rotatable about the axis for movement between the first and second positions, respectively. The obstruction members may be motorized or motor-driven by e.g. an actuator or be configured to be operable between the first position and the second position by an external device, which will be further described below.

The first and second obstruction members may comprise a support portion extending into one of the storage positions when the blocker is in the second position such that the support portions can support a goods holder from below. As such, the support portions of the obstruction members form part of an underlying support for the goods holders. A third (and possible additional support portion(s)) may be arranged at opposite ends of the storage position compared to the obstruction members. These third, and possible additional support portions, does not form part of the blocker but are preferably rotatable such that when the blocker is in the first position, these third, and possible additional support portions are also in a position where they do not limit a cross sectional area of the storage position. As such, when in this position, a goods holder may pass through the storage position in the vertical direction.

The blocker may comprise an obstruction member arranged at a lower part of the side opening, a pivot axis of the obstruction member may extend horizontally and the obstruction member may be rotatable about the horizontal axis for movement between the first position and the second positions, respectively.

The obstruction member may be a plate, and in the first position the plate may extend in a vertical plane and in the second position the plate may extend in a horizontal plane.

The plate may comprise guiding surfaces on both sides thereof. I.e. the plate may comprise guiding surfaces both in the direction oriented towards the transfer column in the first position of the blocker and on the opposite side of the plate.

In a first aspect, the plate may extend into the adjacent column in the horizontal position. In a second aspect, the plate may extend into the transfer column in the horizontal position.

The plate may, when in the horizontal position, form part of a support platform for a goods holder. In other words: when in the first position, the blocker is configured to support a goods holder from below by blocking a cross-sectional area of a lower-part of the storage position.

The supports of the storage positions may be connected to the blocker, such that when the blocker is in the second position, the supports are in the position where they are configured to support a goods holder The container handling vehicles may comprise a lifting device, and the lifting device may comprise a main part (i.e. a lifting frame) connected with lifting bands to a body of the container handling vehicle and a horizontally telescopic part comprising a gripper, and the horizontal telescopic part may be configured to move between a retracted position below the main part and an extended position outside a vertical projection of the main part.

The main part may comprise stabilizing means for securing the main part in the transfer column. This may prevent jamming of lifting device within transfer column when subjected to torque from a goods holder carried by the telescopic part. The stabilizing means can be arranged directly in each of the corners of the main part. Alternatively, as disclosed in WO2020/200631A1 (applicant: AutoStore Technology AS) the system can comprise a guide shuttle arranged to guide the main part of the lifting device and any accompanying storage container as the main part is raised and lowered within the transfer column. The guide shuttle may be arranged above the lifting device and may comprise stabilizing elements or guide elements which are each arranged to interact with one of the four column profiles of upright members of the framework structure to stabilize and maintain horizontal alignment of the main part and any accompanying goods holder during the raising and/or lowering of the main part.

The upright members of the framework structure feature internal guide surfaces arranged to interact with the stabilizing means of the lifting device or guide elements of the guide shuttle.

The stabilizing means may comprise fixed rollers or extendable rollers for engagement with the upright members.

The obstruction member may comprise friction-reducing means. The friction-reducing means may be in the form of rollers, balls, or surface comprising a low coefficient of friction material or a slick surface.

The storage position may comprise a shifter or ball screw device for moving the blocker between the first position and the second position by moving the supports of the storage position between the storage position in the adjacent column and the transfer column through the side opening. Instead of a shifter or ball screw device, a moving belt may be used.

The system may further comprise:

- an additional rail system at a lower elevation than the top of the framework structure;
- a delivery vehicle with support surface operating on the additional rail system, wherein the delivery vehicle with support surface is configured to support a goods holder from below; and wherein the side opening opens towards the additional rail system.

The delivery vehicle with support surface may be configured to move from the additional rail system and into the transfer column through the side opening for transferring a goods holder to, or receiving a goods holder from, a lifting device of a container handling vehicle operating on the rail system on top of the framework structure.

It is further described a method of transferring a goods holder through a side opening in a transfer column in an automated storage and retrieval system, the automated storage and retrieval system comprising a two-dimensional rail system comprising a first set of parallel rails arranged to guide movement of container handling vehicles in a first direction across the top of a framework structure, and a second set of parallel rails arranged perpendicular to the first set of rails to guide movement of the container handling vehicles in a second direction across the top of the framework structure which is perpendicular to the first direction, wherein a number of container handling vehicles operate on the rail system for storing and retrieving goods holders in the automated storage and retrieval system, and wherein the framework structure comprises a transfer column comprising a side opening and an adjustable blocker for obstructing the side opening, the blocker comprising a guiding surface for guiding a lifting device of the container handling vehicle vertically past the side opening; and wherein the method comprises the steps of:

- moving the blocker from a first position to a second position, where, in the first position the guiding surface is positioned to guide the lifting device vertically in the transfer column and obstruct horizontal movement of a goods holder through the side opening, and, in the second position, the guiding surface no longer guides the lifting device and allow horizontal movement of a goods holder through the side opening.

The side opening may open towards an adjacent column, and the container handling vehicle may comprise a lifting device, wherein the lifting device may comprise a main part connected with lifting bands to a body of the container handling vehicle and a horizontally telescopic part comprising a gripper, and wherein the horizontal telescopic part may be configured to move between a retracted position below the main part and an extended position outside a vertical projection of the main part, and wherein the method may comprise the steps of:

moving the telescopic part horizontally from the transfer column and through the side opening thereby moving the blocker from the first position to the second position;

transferring a goods holder to or from the adjacent column;

returning the telescopic part to the transfer column.

When the telescopic part returns to transfer column, the blocker may return to the first position. This may be done using a motorized actuator or a spring or spring-biased actuator which ensures that the blocker returns to the first position.

The system may further comprise an additional rail system at a lower elevation than the top of the framework structure; a delivery vehicle with support surface operating on the additional rail system, and the delivery vehicle with support surface may be configured to support a goods holder from below; and the side opening may open towards the additional rail system, and the method may comprise the steps of:

moving the delivery vehicle with support surface from the additional rail system and into the transfer column through the side opening thereby moving the blocker from the first position to the second position;

transferring a goods holder to, or receiving a goods holder from, a lifting device of a container handling vehicle operating on the rail system on top of the framework structure;

moving the delivery vehicle with support surface from the transfer column and to the additional rail system through the side opening such that the blocker returns to the first position.

The system may further comprise an additional rail system at a lower elevation than the top of the framework structure; a container handling vehicle with lifting device operating on the additional rail system; and the side opening may open towards the additional rail system, and the method may comprise the steps of:

moving the container handling vehicle from the additional rail system and into the transfer column through the side opening thereby moving the blocker from the first position to the second position;

transferring a goods holder to, or receiving a goods holder from, a position further down in the transfer column;

moving the container handling vehicle from the transfer column and to the additional rail system through the side opening such that the blocker returns to the first position.

When the delivery vehicle with support surface returns to the additional rail system, the blocker may advantageously return to the first position. This may be done using a motorized actuator or a spring or spring-biased actuator which ensures that the blocker returns to the first position.

The adjacent column may comprise a plurality of vertically spaced storage positions with supports for supporting goods holders, the storage positions may comprise a shifter, and the method may comprise a step of:

operating the shifter for moving the blocker between the first position and the second position by moving a supports between the adjacent column and the transfer column through the side opening.

The blocker may advantageously return to the first position once the goods holder has been transferred through the side opening. This may be done using a motorized actuator or a spring or spring-biased actuator which ensures that the blocker returns to the first position.

It is further described an automated storage and retrieval system comprising a two-dimensional rail system comprising a first set of parallel rails arranged to guide movement of container handling vehicles in a first direction across the top of a framework structure, and a second set of parallel rails arranged perpendicular to the first set of rails to guide movement of the container handling vehicles in a second direction across the top of the framework structure which is perpendicular to the first direction, wherein a number of container handling vehicles operate on the rail system for storing and retrieving goods holders in the automated storage and retrieval system, and wherein the framework structure comprises:

a subsystem comprising a storage column and at least one transfer column, the system comprises movable posts and/or horizontal supports which are configured to permit access to a storage position within the storage column through a side, a top and/or a bottom.

The subsystem may be a second subsystem and the automated storage and retrieval system may further comprise a first subsystem comprising a plurality of upright members forming storage columns where goods holders are stacked on top of each other.

The two-dimensional rail system may be shared by the first subsystem and the second subsystem in that it may extend over the first subsystem and the second subsystem. In other words, goods holders may be transferred between the first and second subsystem utilizing the same container handling vehicle operating on a rail system above the first and second subsystems.

The storage positions in the second subsystem preferably comprises supports on which the goods holders can be stored. I.e. the storage positions can be vertically spaced such that only one goods holder is supported in each storage position (i.e. the goods holders are not physically stored on top of each other as in the first subsystem). This setup eliminates the need for digging because the storage positions can be accessed through a side, a top and/or a bottom of the storage column.

The second subsystem can be used for goods holders with temporary (e.g. during consolidation of orders) or high frequency access items whereas the first subsystem is for goods holders with regular items.

The invention can be used in concepts relating to goods holder system, as well as in vertical farming and e-grocery applications.

The relative terms "upper", "lower", "below", "above", "higher" etc. shall be understood in their normal sense and as seen in a cartesian coordinate system. When mentioned in relation to a rail system, "upper" or "above" shall be understood as a position closer to the surface rail system (relative to another component), contrary to the terms "lower" or "below" which shall be understood as a position further away from the rail system (relative another component).

BRIEF DESCRIPTION OF THE DRAWINGS

Following drawings are appended to facilitate the understanding of the invention. The drawings show embodiments of the invention, which will now be described by way of example only, where:

FIG. 7A shows the obstruction member in the first position where it guides a lifting device in the transfer column and the support portion is not extending into the storage position, and FIG. 7B shows the obstruction member in the second position where it allows a storage container to pass through the side opening and the support portion extend into the storage position such that the support portion can support a storage container from below;

FIGS. 8A-8C show the obstruction member in the first position where it guides a lifting device in the transfer column and the support portion is not extending into the storage position, and FIG. 8D shows the obstruction member in the second position where it allows a storage container to pass through the side opening and the support portion extend into the storage position such that the support portion can support a storage container from below;

FIG. 9A shows the blocker in the first position, FIG. 9B is a view from the opposite side of FIG. 9A showing the blocker in the second position, FIG. 9C shows a storage container supported on the obstruction member of the blocker which is in the second position, and FIG. 9D shows the blocker in a tilting position for sliding off of a storage container supported thereon;

FIG. 10A shows the obstruction member of blocker in the first position, FIGS. 10B and 10C show the blocker in the first position and a storage container is about to pass vertically through a storage position, FIG. 10D shows the blocker in a tilted intermediate position about to enter the second position where it extends horizontally, where in FIG. 10E the blocker is in the second position, in FIG. 10F the blocker supports a storage container which has entered from above thereon, in FIG. 10G the storage container is about to move through the side opening on the short side, and in FIG. 10H the storage container has moved all the way through the side opening on the short side;

FIG. 11A shows that a storage container is about to move through the side opening on the long side, while FIG. 11B shows that a storage container has moved through the side opening on the long side;

FIG. 13A shows the blocker in the first position guiding a storage container lifted or lowered in the transfer column, and FIG. 13B shows more details of the obstruction member;

FIG. 14D is a view from the opposite side compared to FIG. 14;

FIG. 20A shows the delivery vehicle on the additional rail system outside of the transfer column, FIG. 20B shows the delivery vehicle about to enter the transfer column through the side opening, and in FIG. 20C the delivery vehicle is within the transfer column ready for transferring a storage container to, or receiving a storage container from, a lifting device of a container handling vehicle operating on the rail system on top of the framework structure;

FIG. 22A shows the blocker in the second position wherein the obstruction members extend into the storage position and the transfer column, respectively, FIG. 22B shows the blocker in the first position where both obstruction members extend vertically and block the side opening, and FIG. 22C shows that a storage container is supported on the obstruction members and where the obstruction members are tilted such that the storage container can move between the storage position and the transfer column by means of gravity;

DETAILED DESCRIPTION OF THE INVENTION

Figure 1:
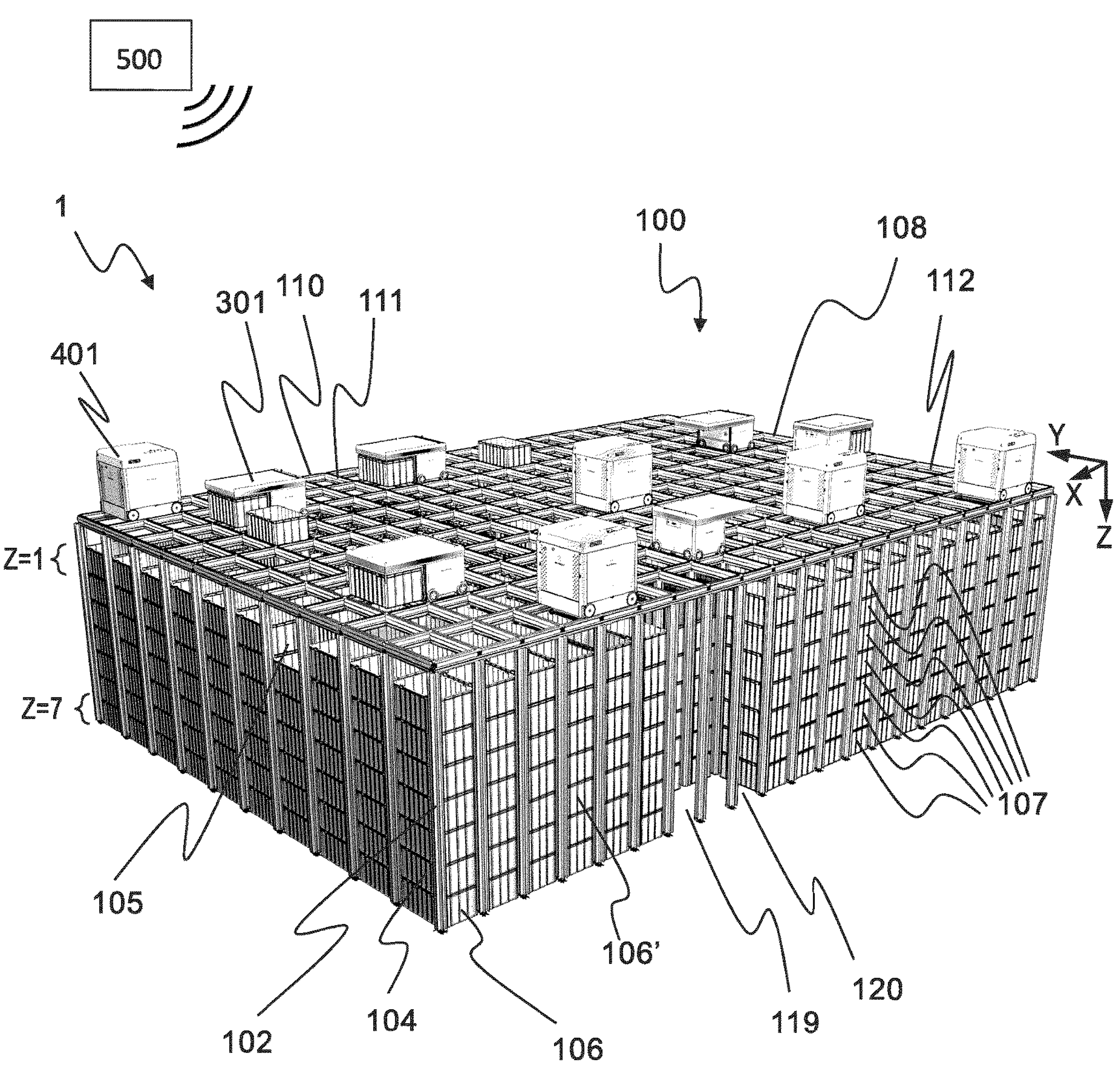
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings. For example, in the drawings, the goods holder is shown by way of storage containers. However, it is clear that other types of goods holders than storage can be used, such as bin, a tote, a pallet, a tray or similar.

Figure 2:
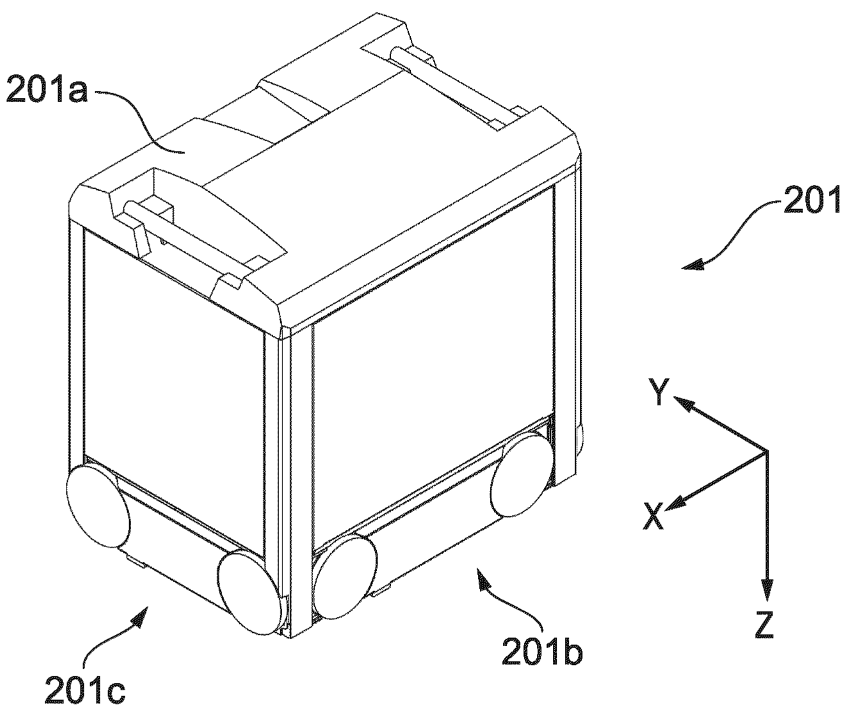
FIG. 2 is a perspective view of a prior art container handling vehicle having an internally arranged cavity for carrying storage containers therein.
Figure 3:
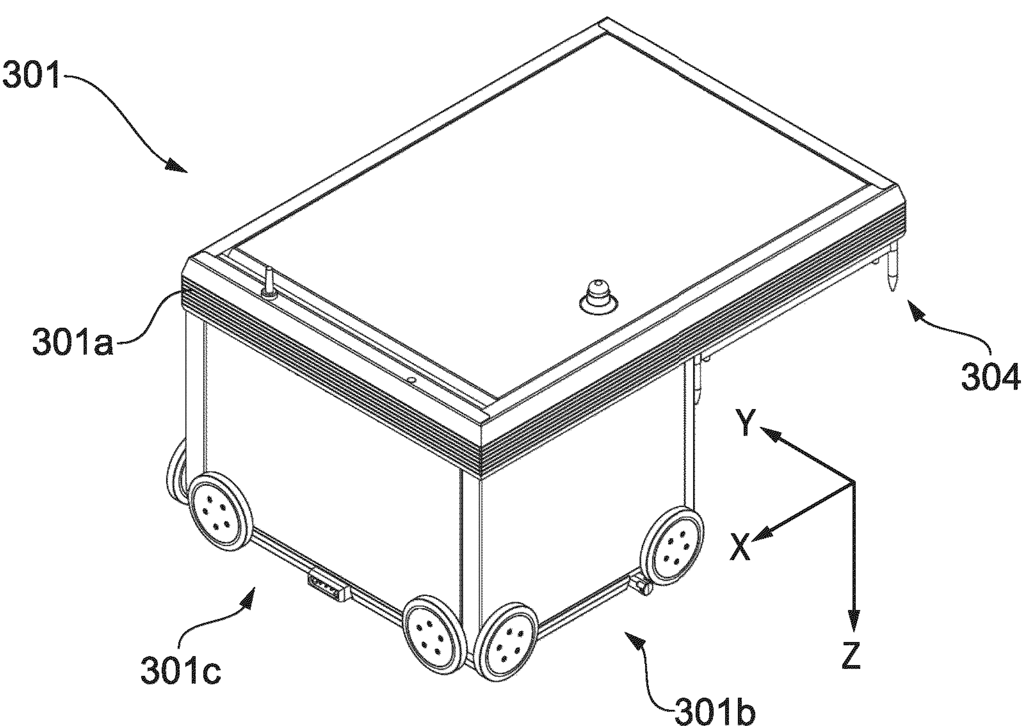
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102, and further that the framework structure 100 comprises a first, upper rail system 108 in the X direction and Y direction.

The framework structure 100 further comprises storage compartments in the form of storage columns 105 provided between the members 102, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 4:
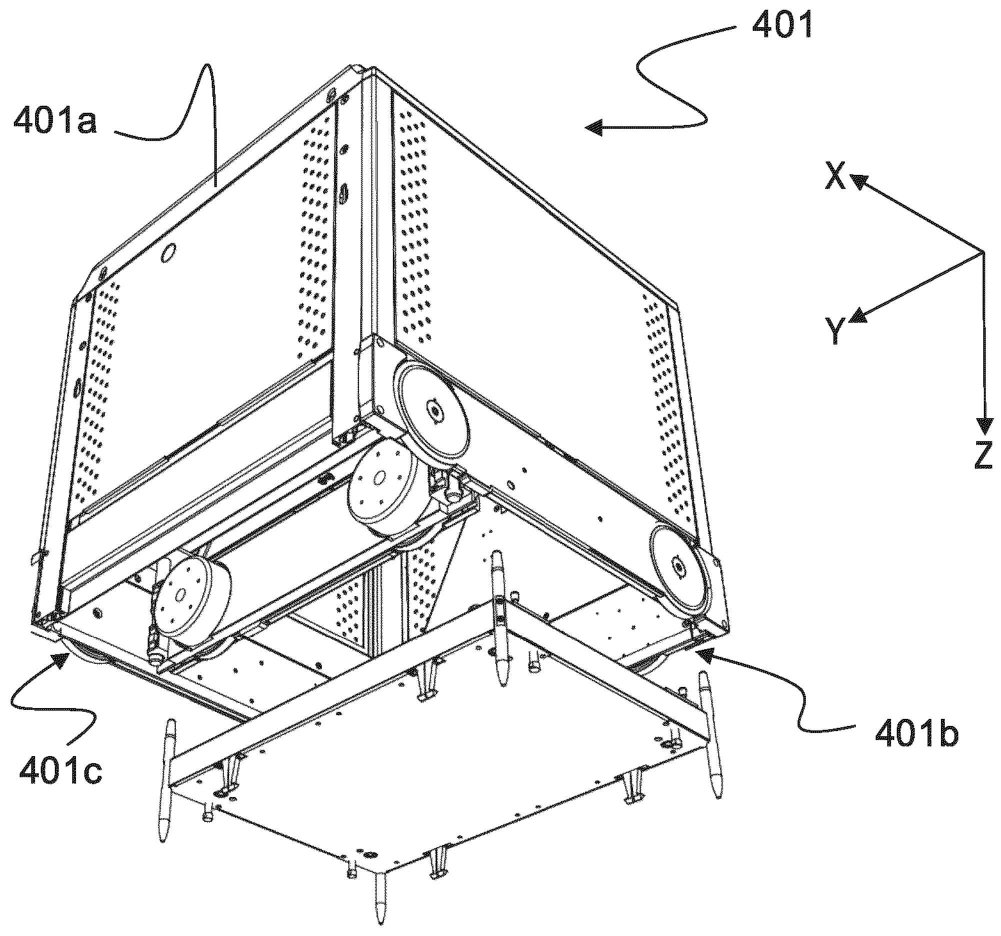
FIG. 4 is a perspective view of a prior art container handling vehicle having a storage space comprising a cavity arranged internally with the vehicle body.

FIG. 4 is a perspective view of a prior art container handling vehicle having a storage space comprising a cavity arranged internally with the vehicle body 401*a*.

Figure 5:
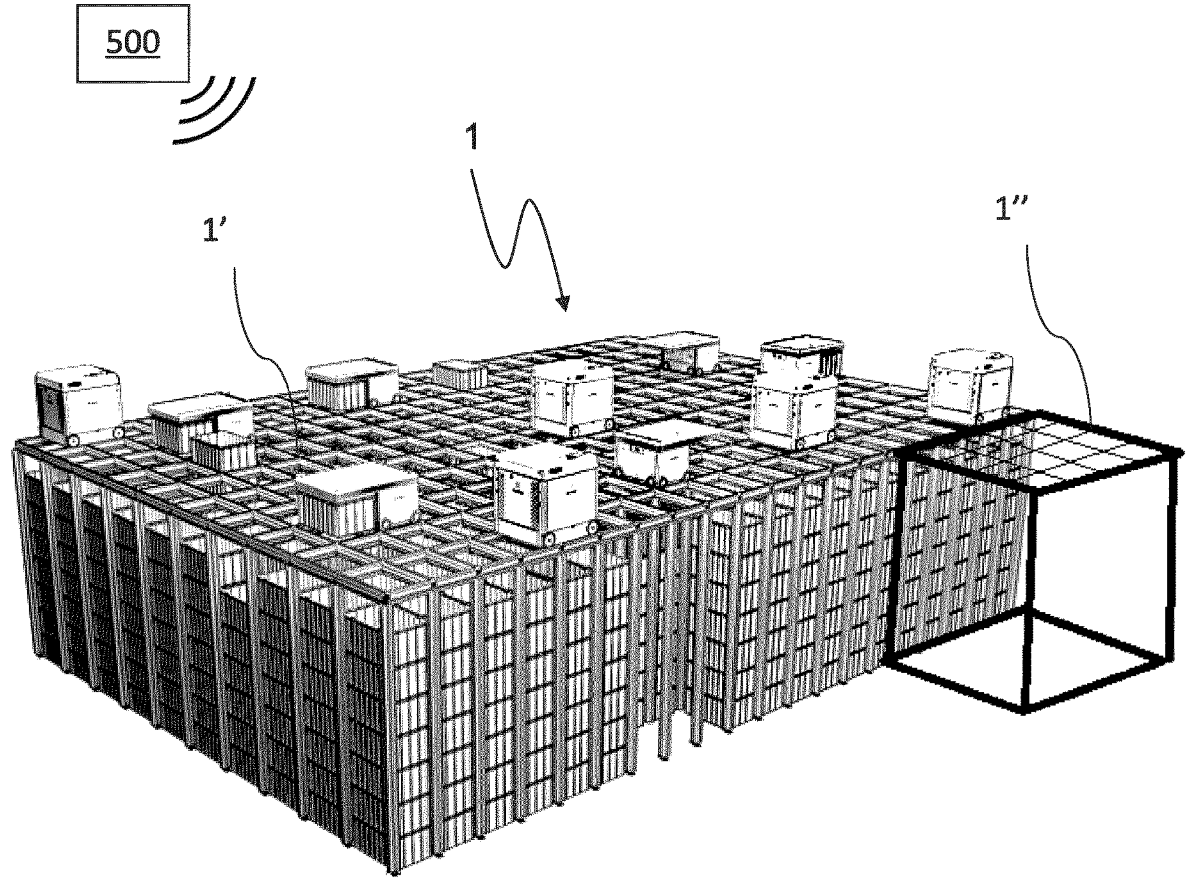
FIG. 5 is an example of an automated storage and retrieval system according to the invention, where the automated storage and retrieval system is divided into two subsystems, where the first subsystem is a relatively larger conventional storage system where the storage containers are stacked on top of each other, while the second subsystem illustrates a relatively smaller system for accommodating a transfer column with side opening and a blocker.

FIG. 5 is an example of an automated storage and retrieval system 1 according to the invention. The automated storage and retrieval system 1 is divided into two subsystems, where the first subsystem 11' is a relatively larger conventional storage system where the storage containers 106 are stacked on top of each other, while the second subsystem 1" illustrates a relatively smaller system.

Figures 6A, 6B, 6C:
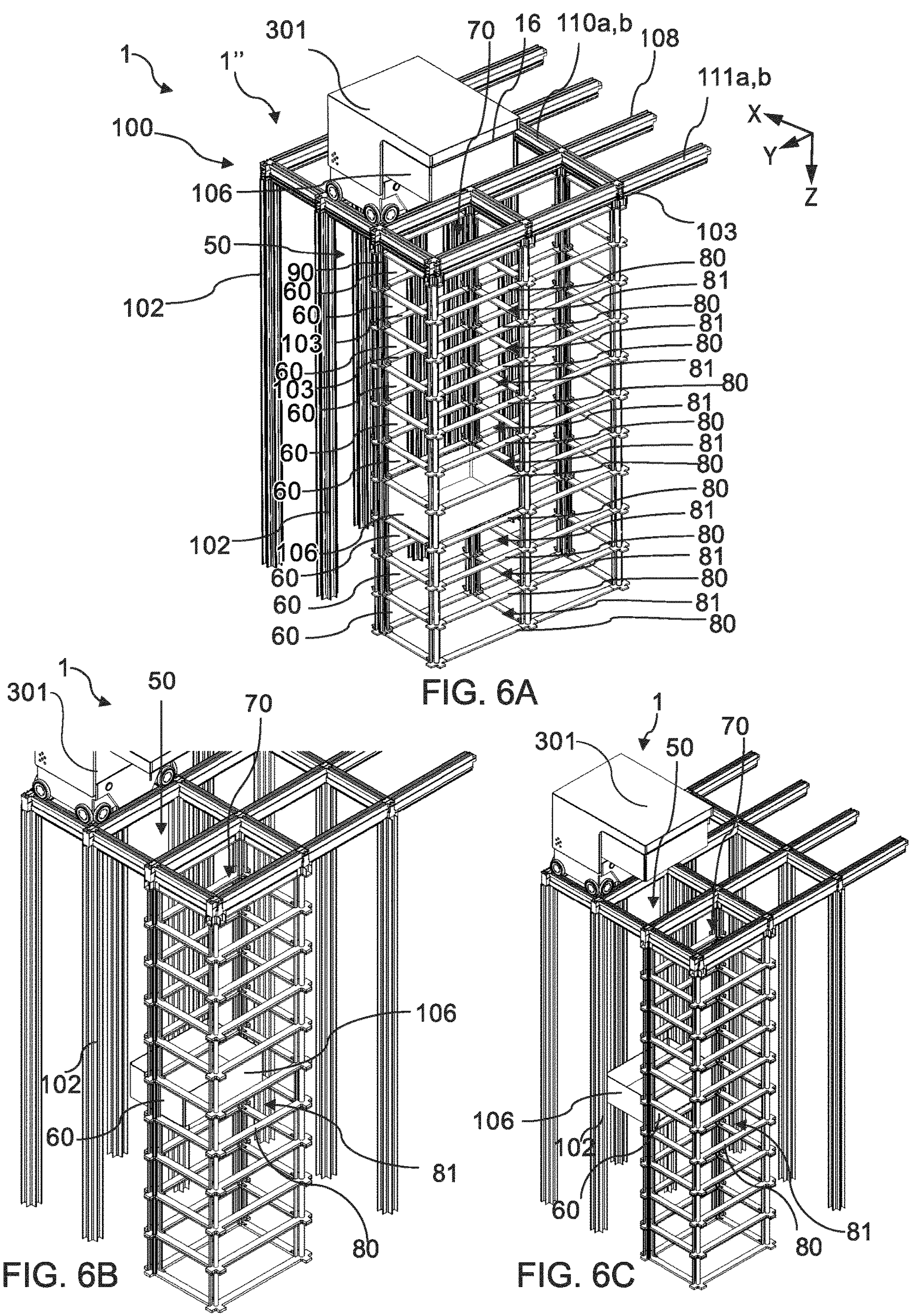
FIGS. 6A-6C show an overview of a possible subsystem of FIG. 5 where a storage container is moveable from a transfer column and sideways through a side opening in the transfer column, where in FIG. 6A a storage container is arranged on supports of a storage position in an adjacent column, in FIG. 6B the storage container of FIG. 6A is arranged in the side opening and is in an intermediate position between the storage position in the adjacent column and the transfer column, whereas in FIG. 6C the storage container has moved all the way through the side opening and is in the transfer column.

FIGS. 6A-6C show an overview of a possible subsystem 1" of FIG. 5 where a storage container 106 is moveable from a transfer column 50 and sideways through a side opening 60 in the transfer column 50. In FIG. 6A a storage container is arranged on supports 80 of a storage position 81 in an adjacent column 70. In FIG. 6B the storage container 106 of FIG. 6A is arranged in the side opening 60 and is in an intermediate position between the storage position 81 in the adjacent column 70 and the transfer column 50. In FIG. 6C the storage container 106 has moved all the way through the side opening 60 and is in the transfer column 50.

Further referring to FIGS. 6A-6C, the side opening 60 opens towards an adjacent column 70 in the form of a storage column with a plurality of vertically spaced storage positions 81 with supports 80 for supporting storage containers 106 from below. The framework structure 100 comprises upright members 102 delimiting the horizontal extent of the transfer column 50 and a number of horizontal members 103 which are supported by the upright members 102.

As seen in FIG. 6A, it is shown a two-dimensional rail system 108 comprising a first set of parallel rails 110 arranged to guide movement of container handling vehicles 301 in a first direction X across the top of a framework structure 100, and a second set of parallel rails 111*a,b* arranged perpendicular to the first set of rails 110*a,b* to guide movement of the container handling vehicles 301 in a second direction Y across the top of the framework structure 100 which is perpendicular to the first direction X, wherein a container handling vehicle 301 operates on the rail system 108 for storing and retrieving storage containers 106 in the automated storage and retrieval system 1. The framework structure 100 is disclosed with a transfer column 50 comprising a side opening 60. An adjustable blocker 90 (shown in more detail below) is provided for obstructing the side opening 60. The blocker 90 comprising a guiding surface for guiding a lifting device 16 of the container handling vehicle 301 vertically past the side opening 60.

The blocker 90 is movable between:

a first position, where the guiding surface is positioned to vertically guide the lifting device 16 and obstruct horizontal movement of a storage container 106 through the side opening 60, and a second position, where the guiding surface is positioned not to guide the lifting device 16 and allow horizontal movement of a storage container 106 through the side opening 60.

Figure 7A:
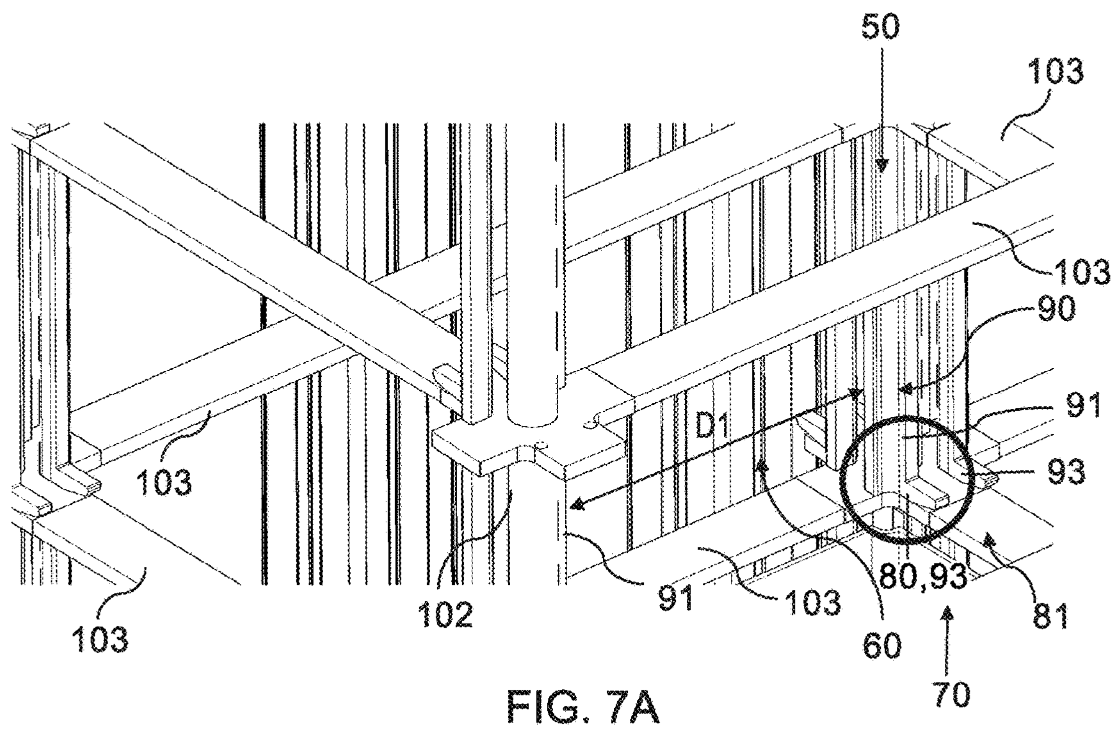
FIGS. 7A and 7B show a first embodiment of a blocker according to the invention comprising a pair of first and second obstruction members rotatable about a vertical axis, the obstruction members are arranged at opposite edges of the side opening and comprises a support portion, where
Figure 7B:
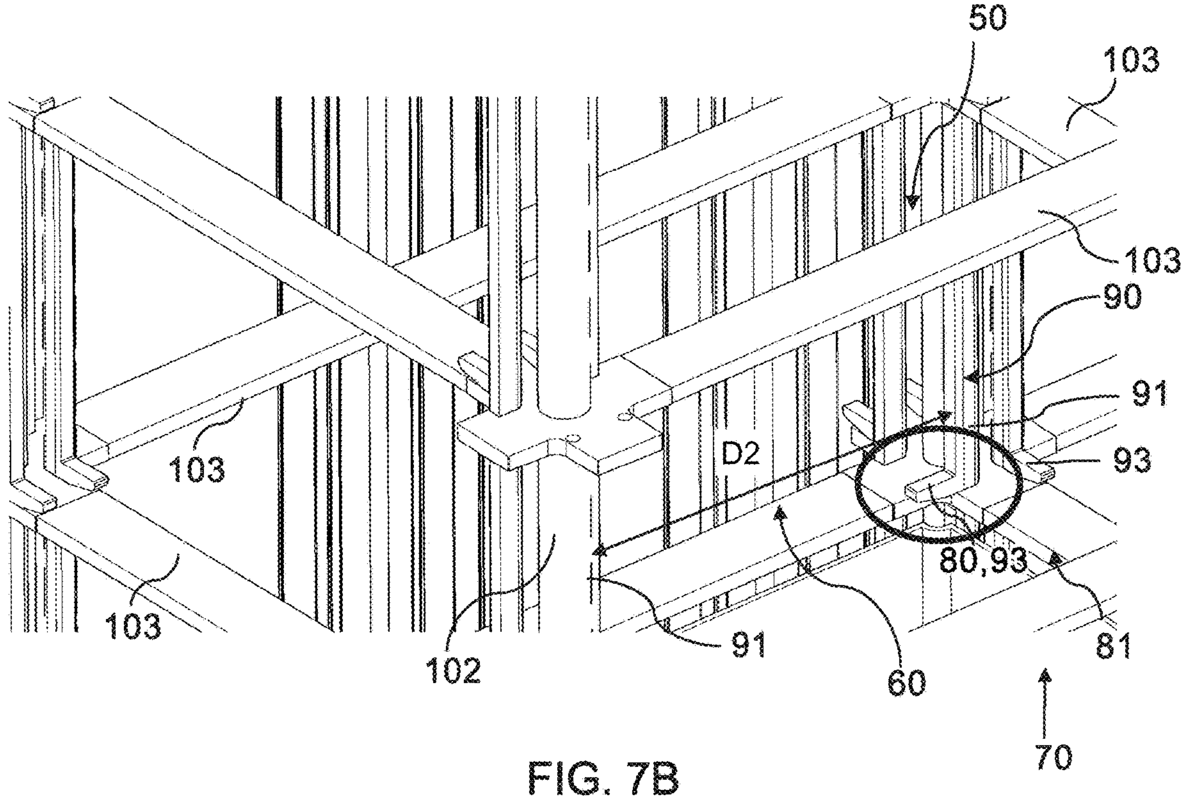

FIGS. 7A and 7B show a first embodiment of a blocker 90 according to the invention comprising a pair of first and second obstruction members 91 rotatable about a vertical axis. The obstruction members 91 are arranged at opposite edges of the side opening 60 and comprises a support portion 93. In FIG. 7A the obstruction member 91 is in the first position where it may guide a lifting device 16 (not shown in FIGS. 7A and 7B) in the transfer column 50 and the support portion 93 is not extending into the storage position 81. In FIG. 7A the distance D1 between the pair of obstruction members 91 is shown by arrow D1.

In FIG. 7B the obstruction members 91 of the blocker 90 are in the second position where it allows a storage container 106 (not shown) to pass through the side opening 60. The support portion 93 extend into the storage position 81 such that the support portion 93 can support a storage container 106 from below (as illustrated when comparing the orientation of the support portion 93 in FIGS. 7A and 7B). In FIG. 7B the distance D2 between the pair of obstruction members 91 is shown by arrow D2. When comparing the distance between the obstruction members 91 in FIG. 7A and FIG. 7B, it can be seen that the distance D2 is larger than distance D1, meaning that in FIG. 7B the side opening 60 has a larger horizontal extent for a storage container 106 to pass therethrough, while in FIG. 7A the obstruction members are too close and rather functions as guides for vertical guiding of lifting devices passing past the side opening 60.

FIGS. 8A-8D show a second embodiment of a blocker 90 according to the invention comprising a pair of first and second obstruction members 91 arranged at opposite edges of the side opening 60. The side opening 60 being on a long side of the transfer column 50. The obstruction members 91 are rotatable about a pivot axis for movement between the first and second positions.

Figures 8A, 8B, 8C:
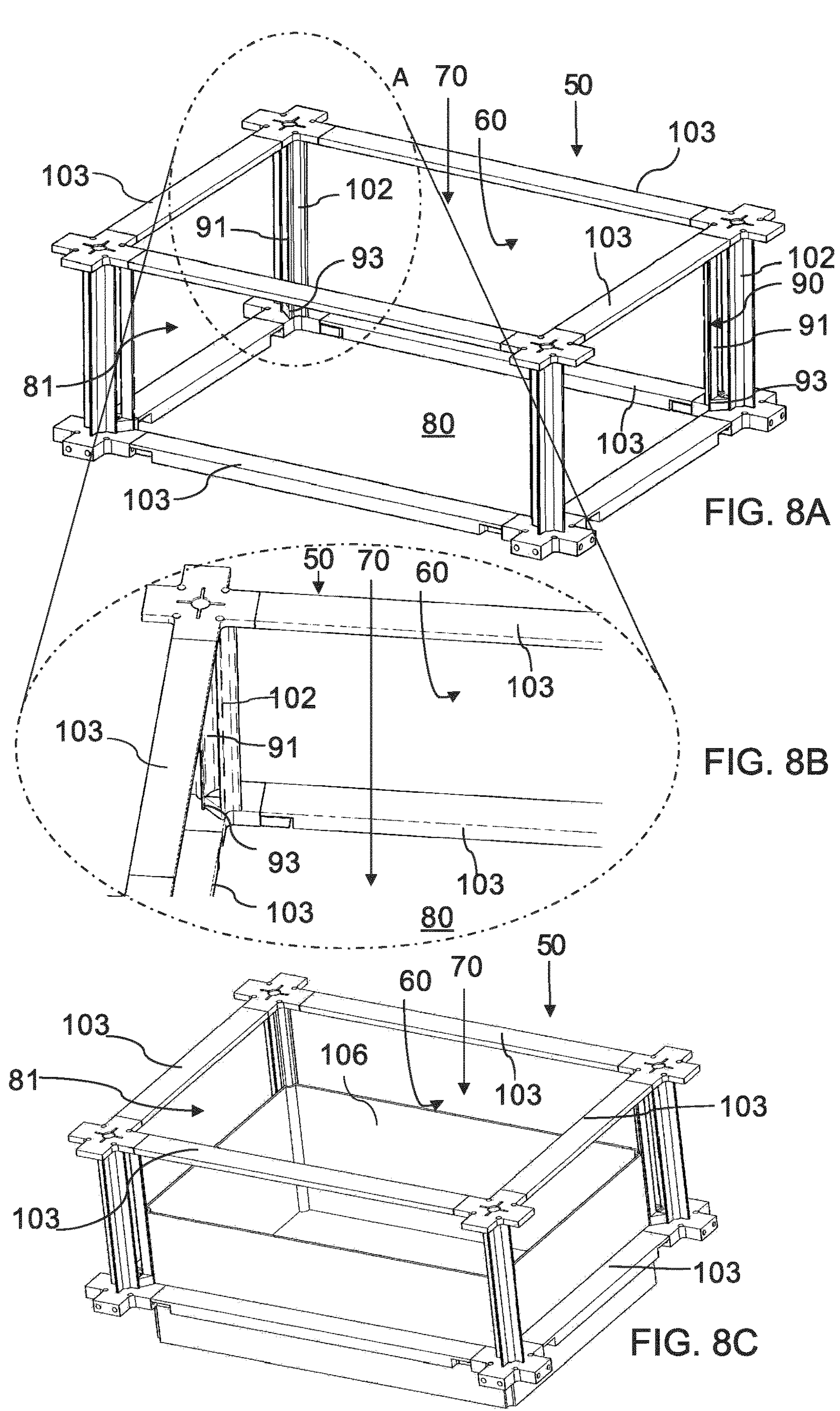
FIGS. 8A-8D show a second embodiment of a blocker according to the invention comprising a pair of first and second obstruction members arranged at opposite edges of the side opening, the side opening being on a long side, and where the obstruction members are rotatable about the pivot axis for movement between the first and second positions where

FIG. 8B is a detailed view of section A in FIG. 8A. FIGS. 8A-8C show the obstruction member 91 in the first position where it is configured to guide a lifting device 16 in the transfer column 50 and the support portion 93 is not extending into the storage position 81. As seen in FIG. 8C, in this configuration, the obstruction member 91 allows a storage container 106 to pass through the storage position 81 vertically.

Figure 8D:
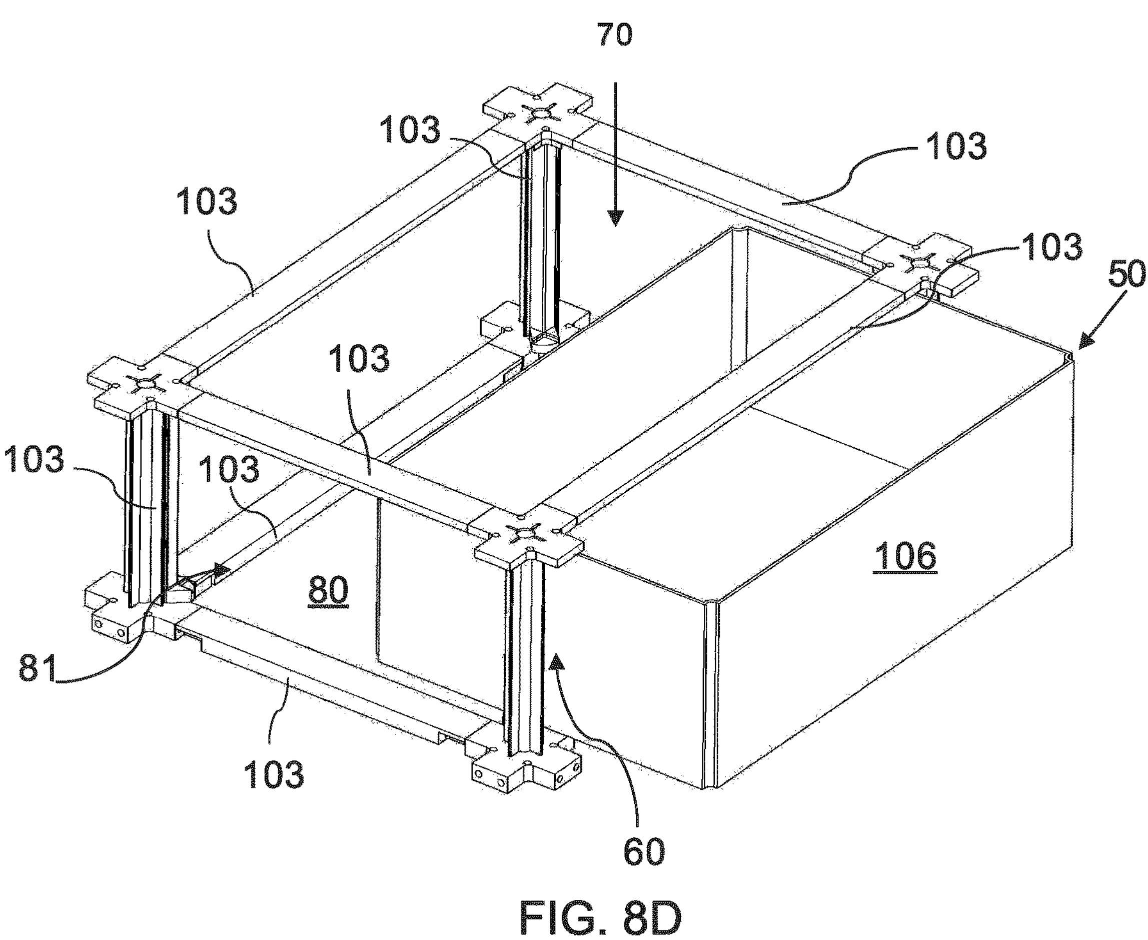

FIG. 8D shows the obstruction member 91 in the second position where it allows a storage container 106 to pass through the side opening 60 and the support portion 93 extends into the storage position 81 such that the support portion 93 can support a storage container 106 from below.

Figure 8E:
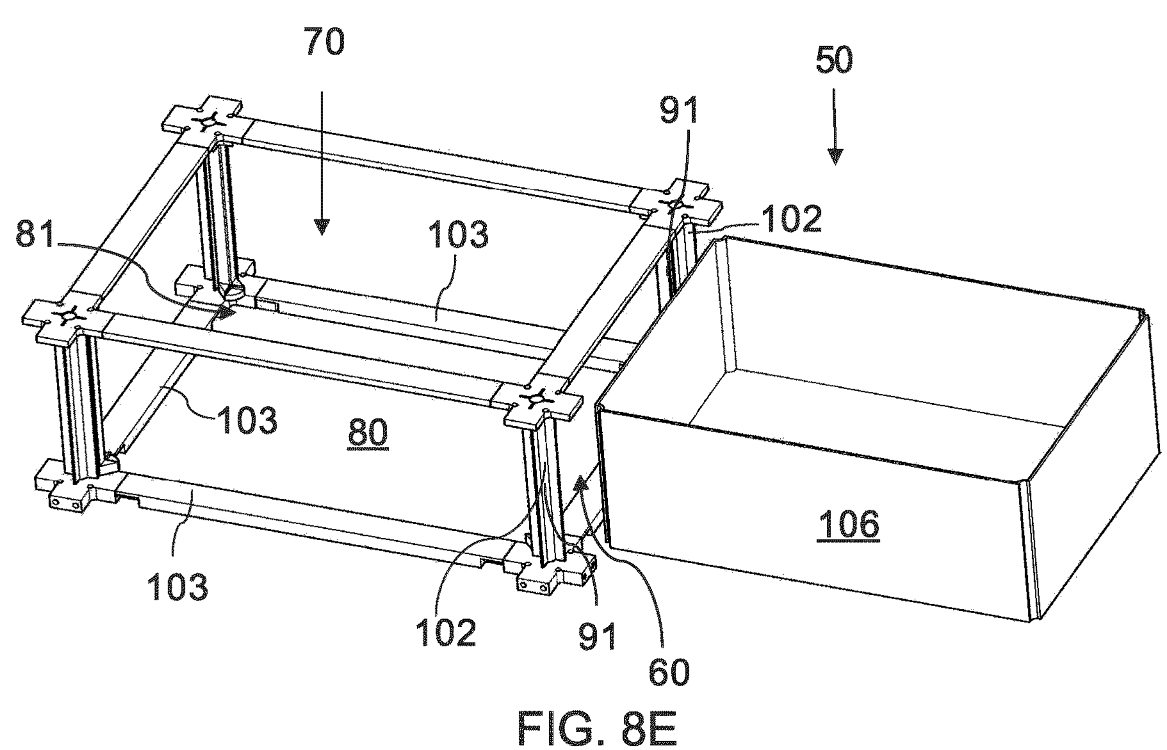
FIG. 8E is an alternative to the embodiment in FIGS. 8A-8D, where the side opening is on a short side.

FIG. 8E is an alternative to the embodiment in FIGS. 8A-8D, where the side opening 60 is on a short side of the transfer column 50.

Figure 8F:
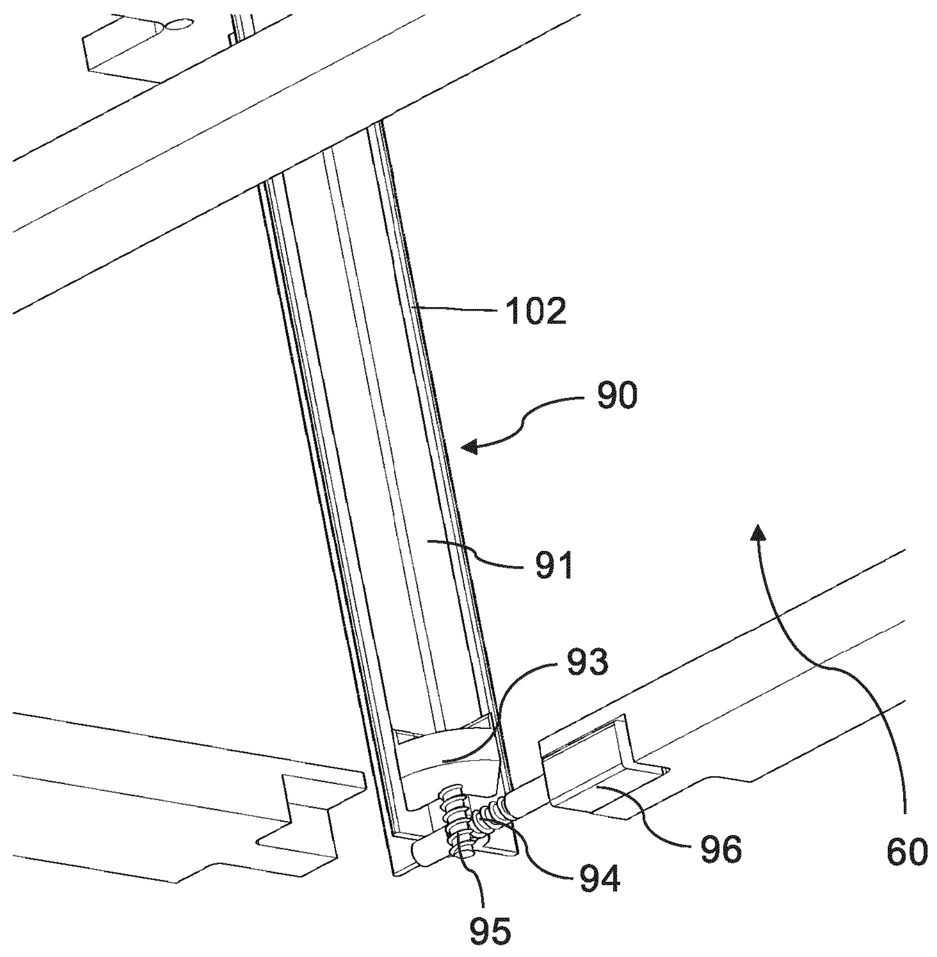
FIG. 8F shows an example of a mechanism for moving the obstruction members of the blocker between the first position and the second position.

FIG. 8F shows an example of a mechanism for moving the obstruction members 91 of the blocker 90 between the first position and the second position. The mechanism comprising an angled gear comprising a first part 94 and a second part 95. The first part 94 is rotatably connected to a motor 96. The second part 95 is rotatably connected to a pivot axis of the obstruction member 91 in a worm gear arrangement.

When the motor 96 rotates the first part 94, the angled gear transfers the movement to the second part 95 and thus the obstruction member 91. As such, the blocker 90 can be operated between the first position and the second position upon rotation of the obstruction member 91.

FIGS. 9A-9D shows a third embodiment of the blocker 90. The blocker 90 comprises an obstruction member 92 hinged at a lower part of the side opening 60 and wherein the side opening 60 is at a long side of the transfer column 50. A pivot axis of the obstruction member 92 extends horizontally along the long side and the obstruction member is rotatable about the horizontal axis for movement between the first position and the second position.

Figures 9A, 9B:
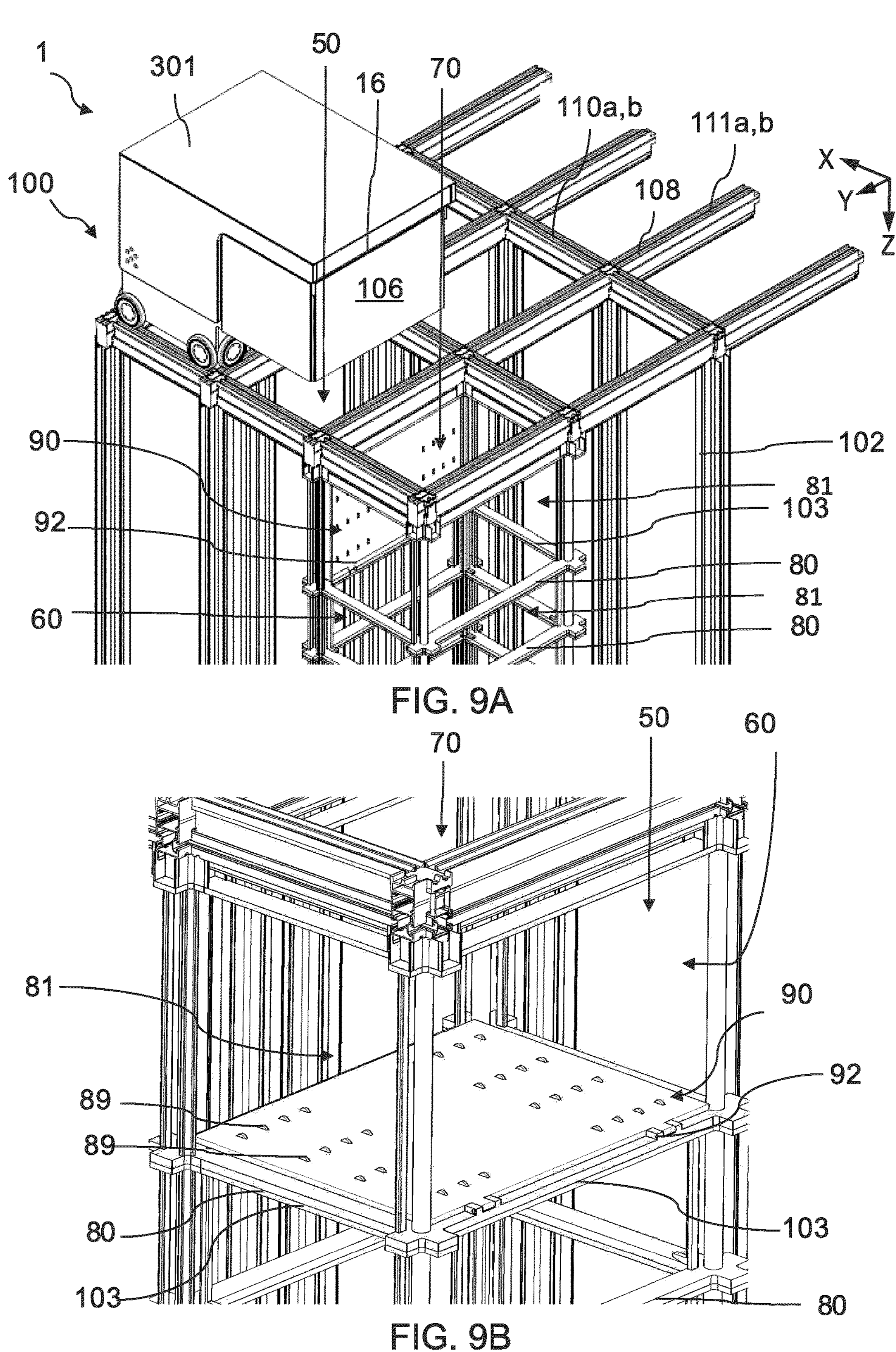
FIGS. 9A-9D shows a third embodiment of the blocker, where the blocker comprises an obstruction member hinged at a lower part of the side opening and wherein the side opening is at a long side of the transfer column, wherein a pivot axis of the obstruction member extends horizontally along the long side and the obstruction member is rotatable about the horizontal axis for movement between the first position and the second position and where the blocker extends into the storage position when in the second position, and where

In FIG. 9A shows the blocker 90 in the first position where the obstruction member 92 covers the side opening 60. The obstruction member 92 is illustrated as a pivoted plate which pivots about a horizontal axis. When in the upright position the obstruction member 92 guides storage containers 106 moving vertically in the transfer column 50 and blocks the side opening 60 of the transfer column 50, whereas in the second position the plate extends horizontally allowing throughput of a storage container 106 through the side opening 60. A plurality of vertically spaced storage positions 81 with supports 80 for supporting storage containers 106 are arranged in the adjacent column 70.

FIG. 9B shows the obstruction member 92 of the blocker 90 in the second position extending into the storage position 81. In order for the guiding surface of the blocker 90 to reduce friction and improve guiding of the lifting device 16 of the container handling vehicle 301 (see FIG. 9A), friction reducing means 89 in the form of rollers 89 may be provided on the guiding surface.

Figures 9C, 9D:
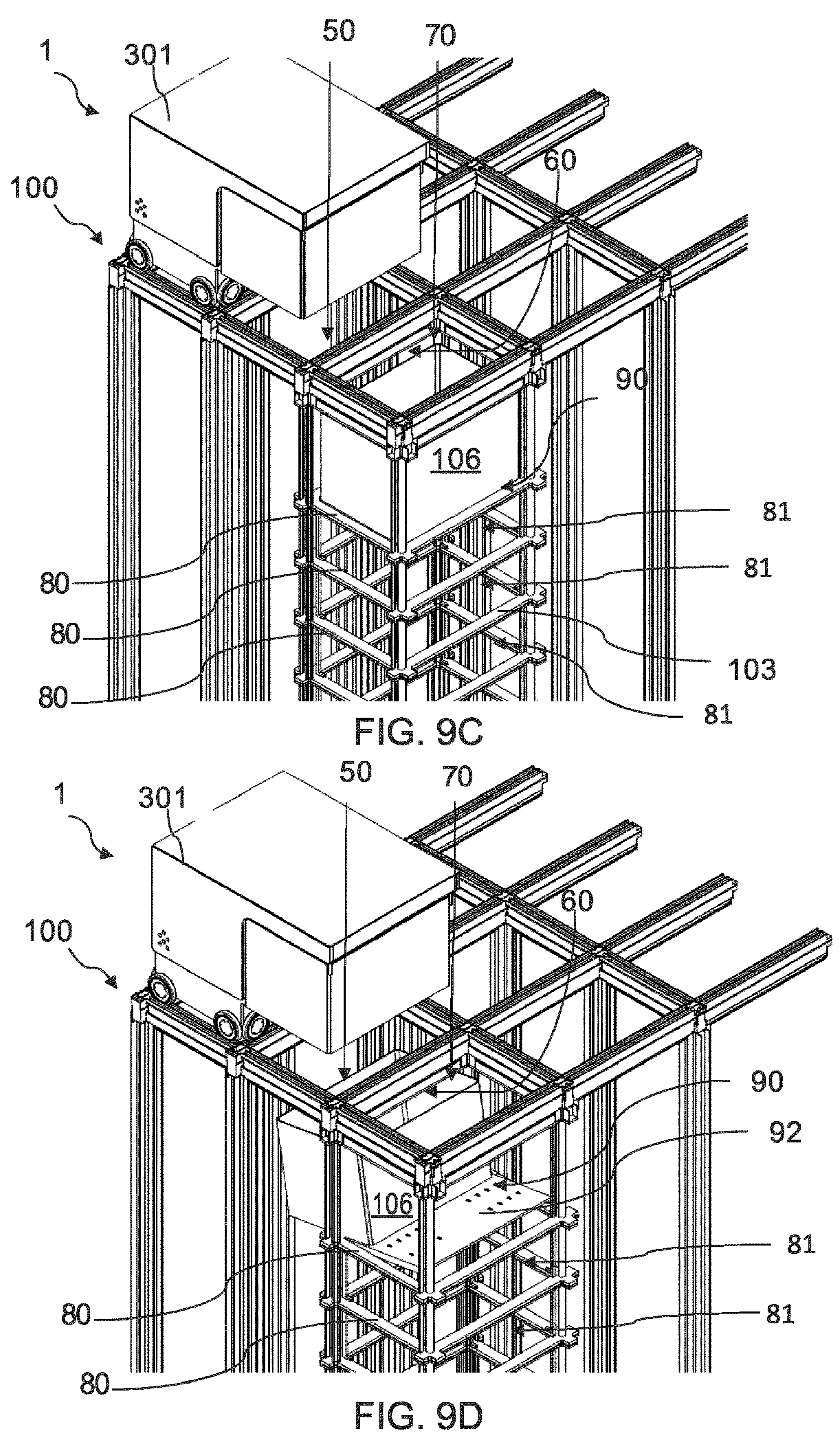

FIG. 9C shows a storage container 106 supported on the obstruction member 92 of the blocker 90 which is in the second position (under the storage container 106 in FIG. 9C).

FIG. 9D shows the obstruction member 92 of the blocker 90 in a tilting position for sliding off of a storage container 106 supported thereon between the storage position 81 in the adjacent column 70 and the transfer column 50. Tilting the obstruction member 92 (i.e. the guiding surface) with rollers 89 provides possibility that the obstruction member 92 forces the storage container 106 into the transfer column 50 by means of gravity. The blocker 90 may be motor-driven such that upon actuation of a motor, the blocker 90 can move between the first position and the second position, and vice versa, thereby possibly slide off any storage container 106 supported thereon. Alternatively, the blocker 90 can be spring-loaded such that it returns to the first or second position after being forced into the other of said positions.

A storage container is allowed to move horizontally through the side opening.

FIGS. 10A-10H show another example of the third embodiment of the blocker 90, where the blocker 90 is arranged on the short side of the transfer column 50.

Figure 10A:
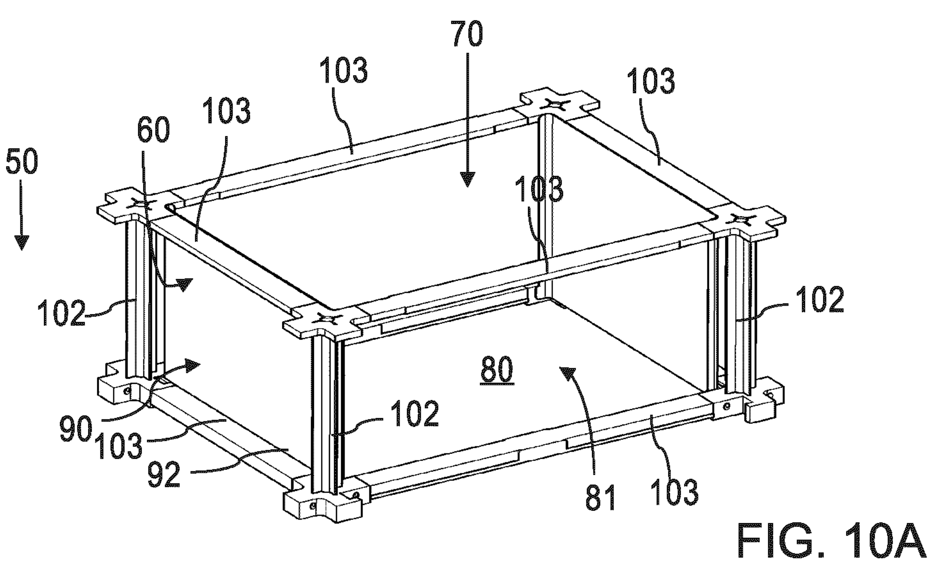
FIGS. 10A-10H show another example of the third embodiment of the blocker, where the blocker is arranged on the short side of the transfer column, and where

FIG. 10A shows the obstruction member 92 of the blocker 90 in the first position.

Figure 10B:
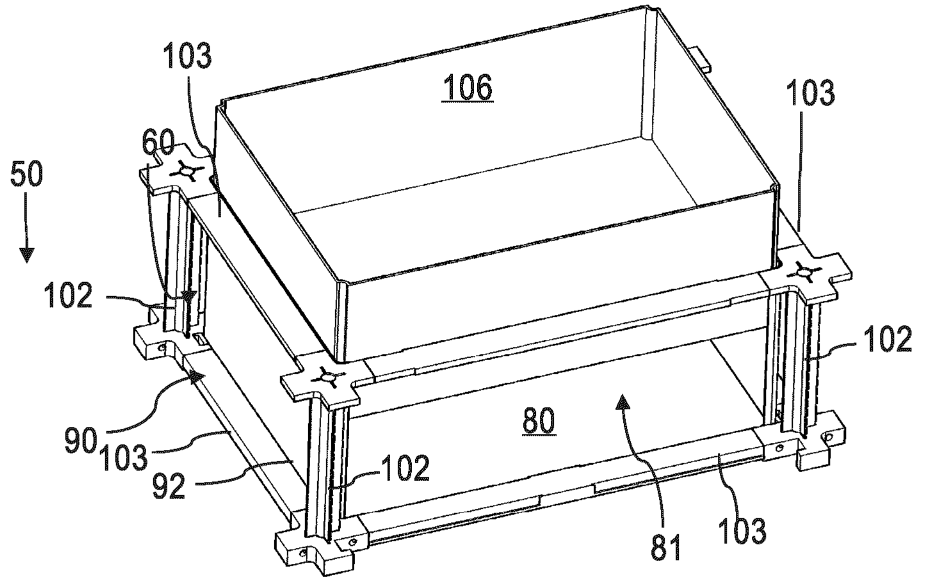
Figure 10C:
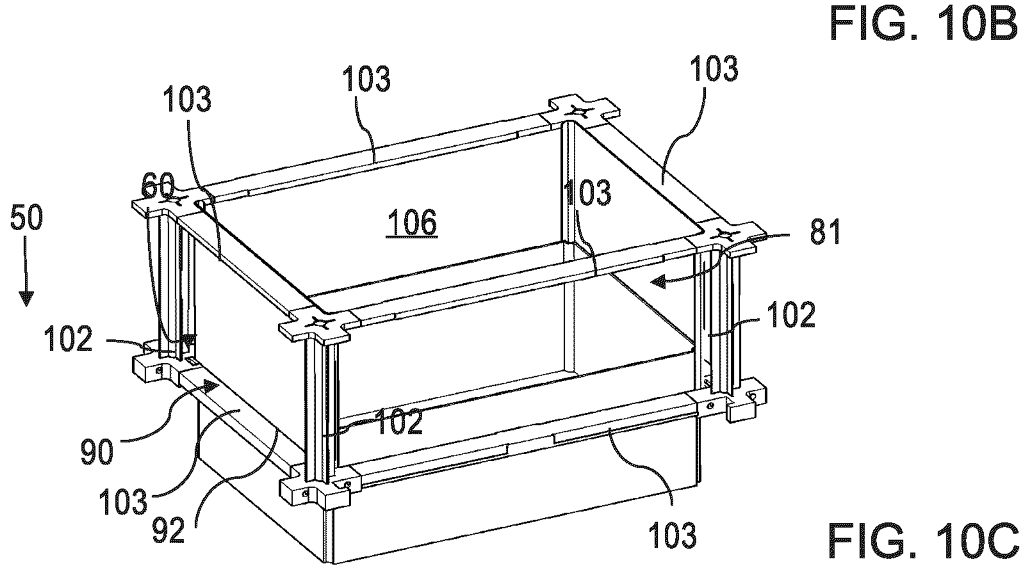

FIGS. 10B and 10C show the blocker 90 in the first position and a storage container 106 is about to pass vertically through the storage position 81.

Figures 10D, 10E, 10F:
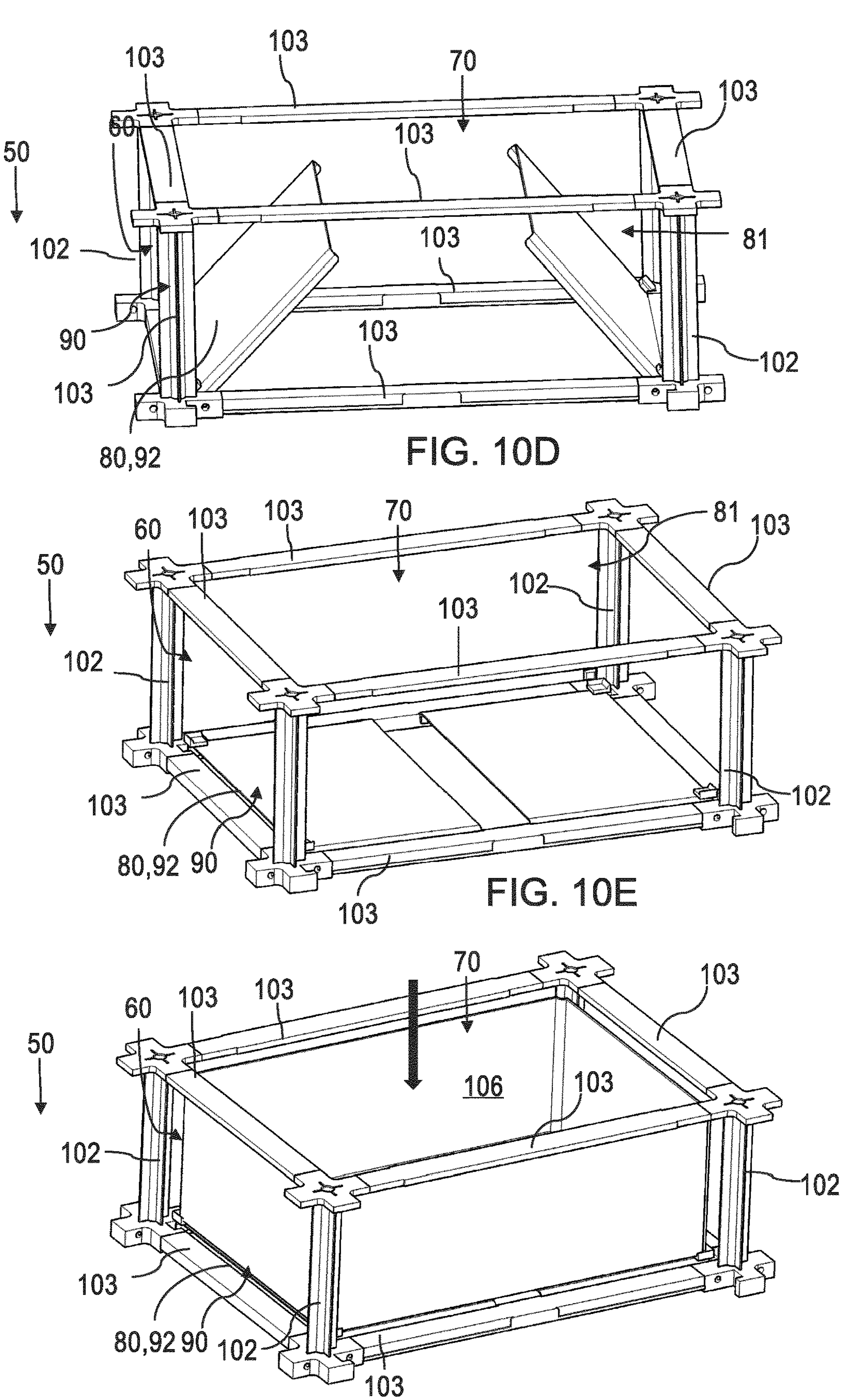

FIG. 10D shows the blocker 90 in a tilted intermediate position about to enter the second position where it extends horizontally. In FIG. 10E the blocker 90 is in the second position.

In FIG. 10F the blocker 90 supports a storage container 106 which has entered from above thereon.

Figure 10G:
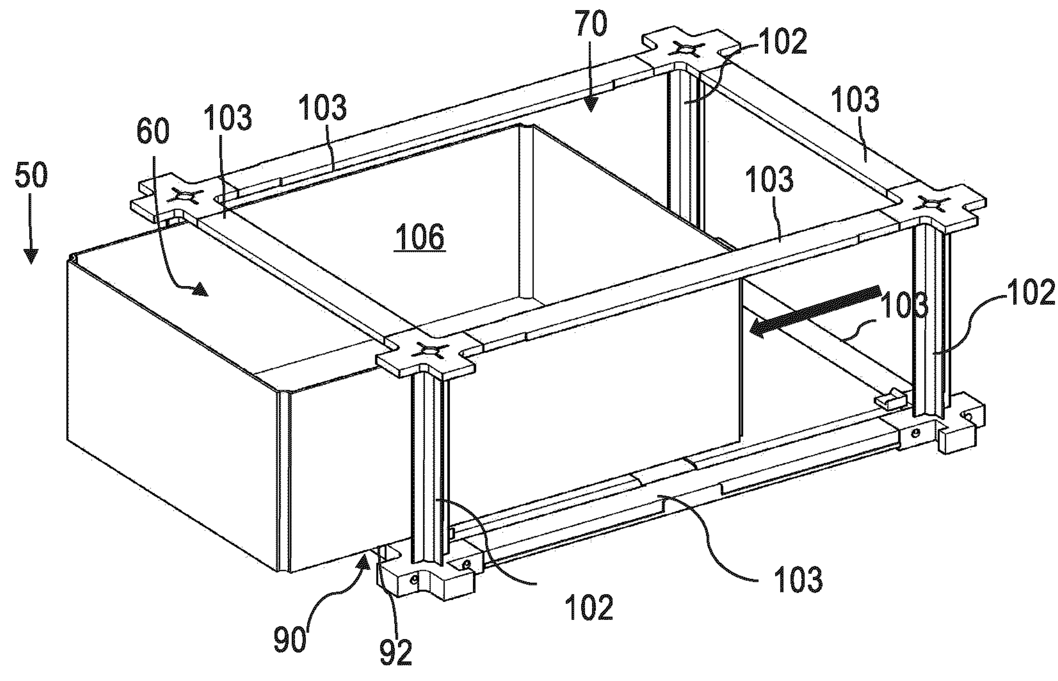

In FIG. 10G the storage container 106 is about to move through the side opening 60 on the short side.

Figure 10H:
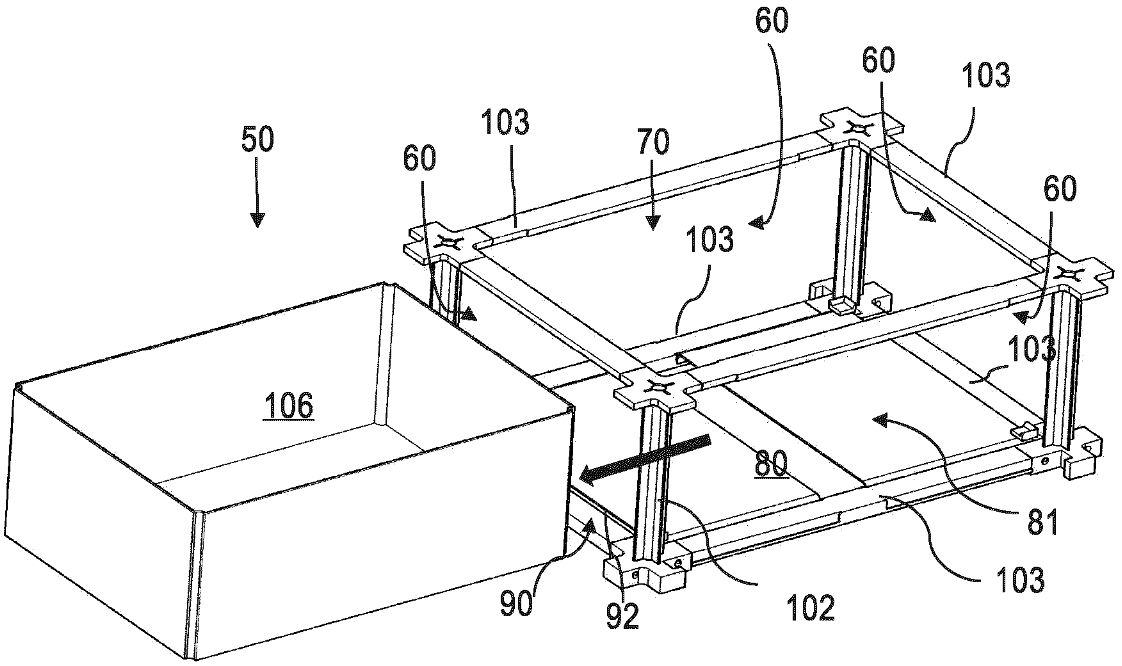

In FIG. 10H the storage container 106 has moved all the way through the side opening 60 on the short side.

Referring to FIG. 10H, regardless of how the storage position 81 looks like, the storage position 81 may be configured with similar additional side openings 60 as the side opening 60 towards the transfer column 50. There may be arranged additional side openings 60 on one, two or three of the other four sides. This render possible that a storage container 106 can be retrieved and inserted horizontally or sideways into the storage position 81. This possibility may further be advantageous if the storage position 81 is at the edge of the automated storage and retrieval system 1 such that a robotic operator or human operator can retrieve or insert the storage container 106 from a position outside the automated storage and retrieval system 1.

Figures 11A, 11B:
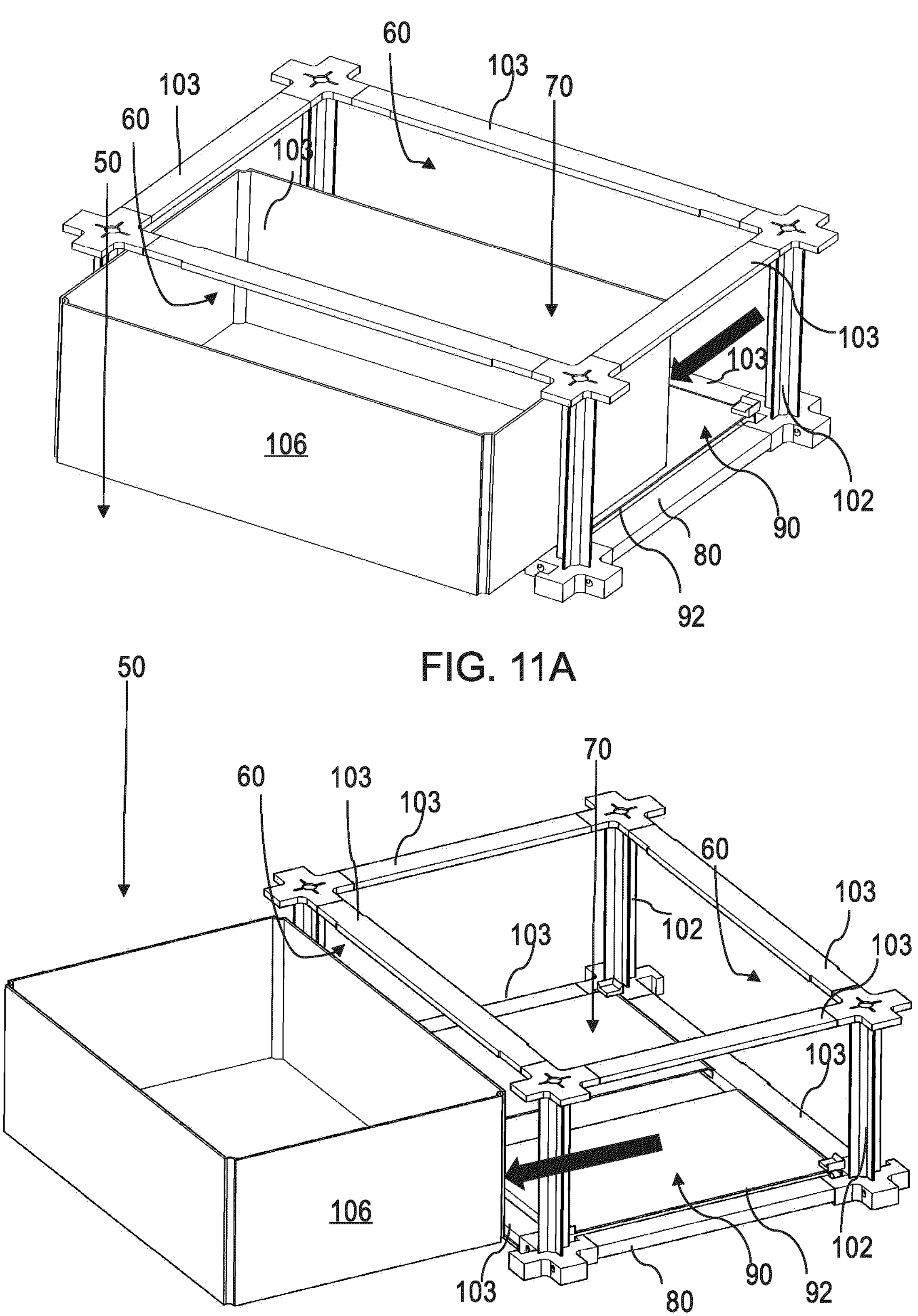
FIGS. 11A and 11B show different possibilities to FIGS. 10A-10H, where the side opening is arranged on the long side, and where

FIGS. 11A and 11B show different possibilities to FIGS. 10A-10H, where the side opening 60 is arranged on the long side, and where FIG. 11A shows that a storage container 106 is about to move through the side opening 60 on the long side, while FIG. 11B shows that a storage container 106 has moved through the side opening 60 on the long side.

Figure 12:
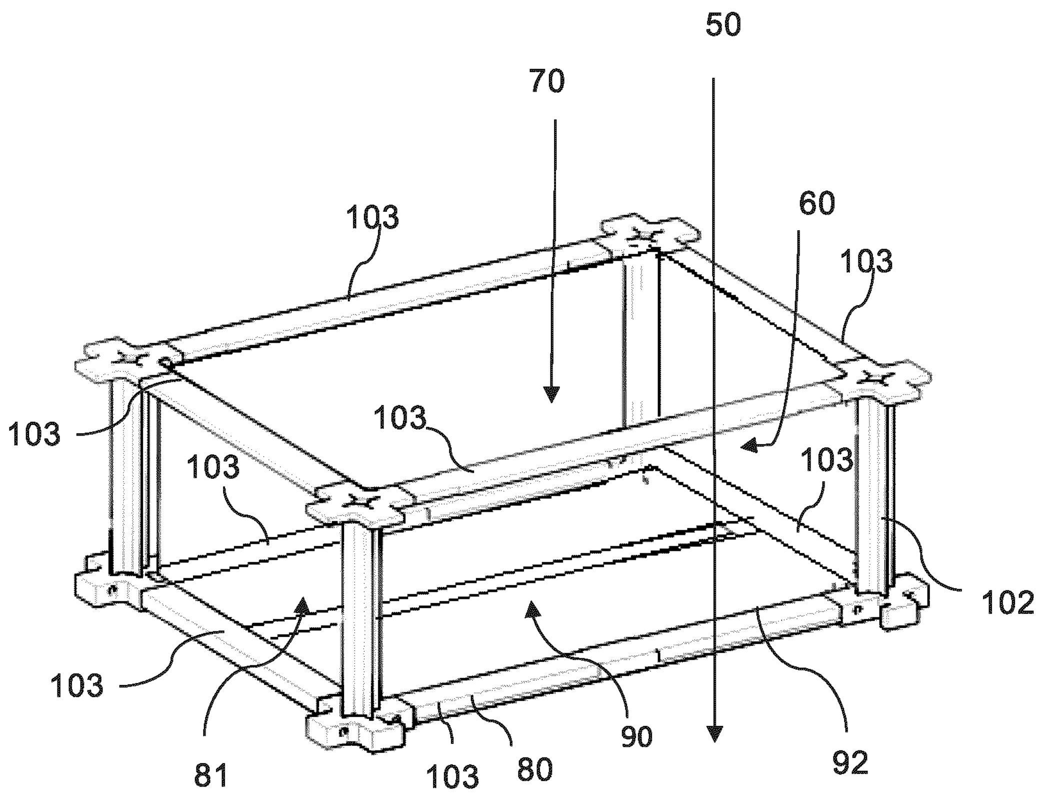
FIG. 12 is an alternative to FIGS. 10A-10G and 11 wherein a pivot axis of the obstruction member extends horizontally along the long side and the obstruction member is rotatable about the horizontal axis for movement between the first position and the second position.

FIG. 12 is an alternative to FIGS. 10A-10G and 11A and 11B wherein a pivot axis of the obstruction member 92 of the blocker 90 extends horizontally along the long side and the obstruction member 92 is rotatable about the horizontal axis for movement between the first position and the second position.

Figure 13A:
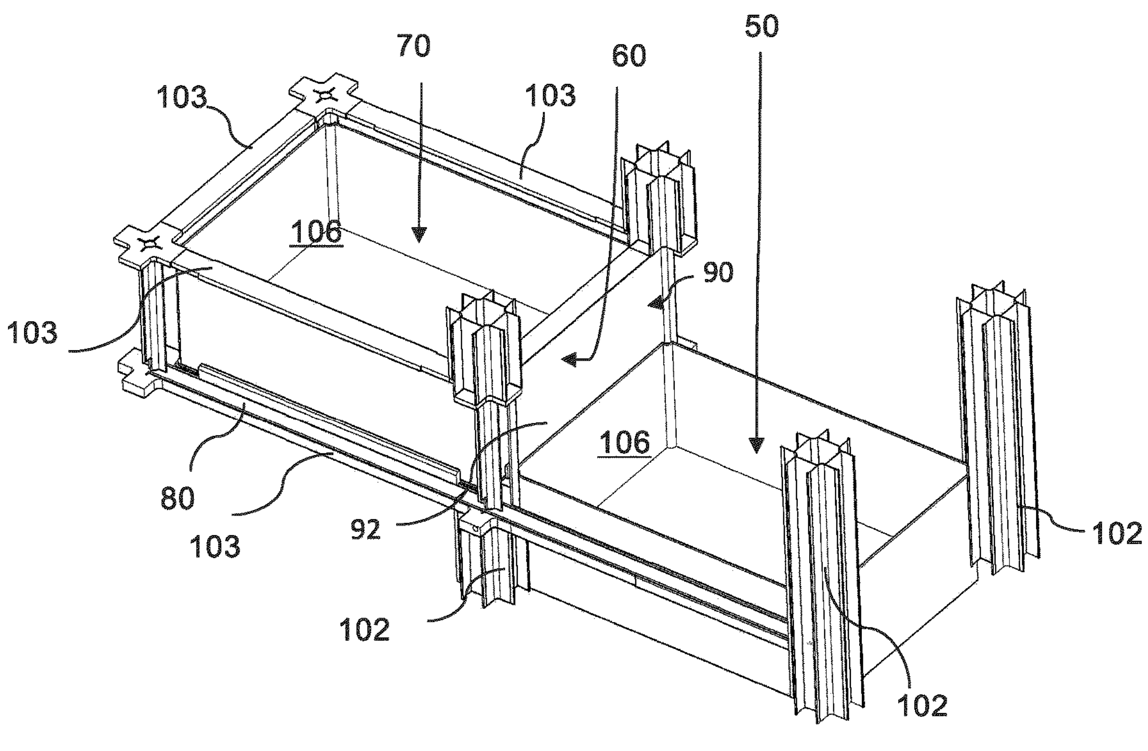
FIGS. 13A-13B show a fourth embodiment of the blocker, where the blocker comprises an obstruction member arranged at a lower part of the side opening and wherein the side opening is at a short side of the transfer column, wherein a pivot axis of the obstruction member extends horizontally along the short side and the obstruction member is rotatable about the horizontal axis for movement between the first position and the second position and where the blocker extends into the transfer column when in the second position, and where
Figure 13B:
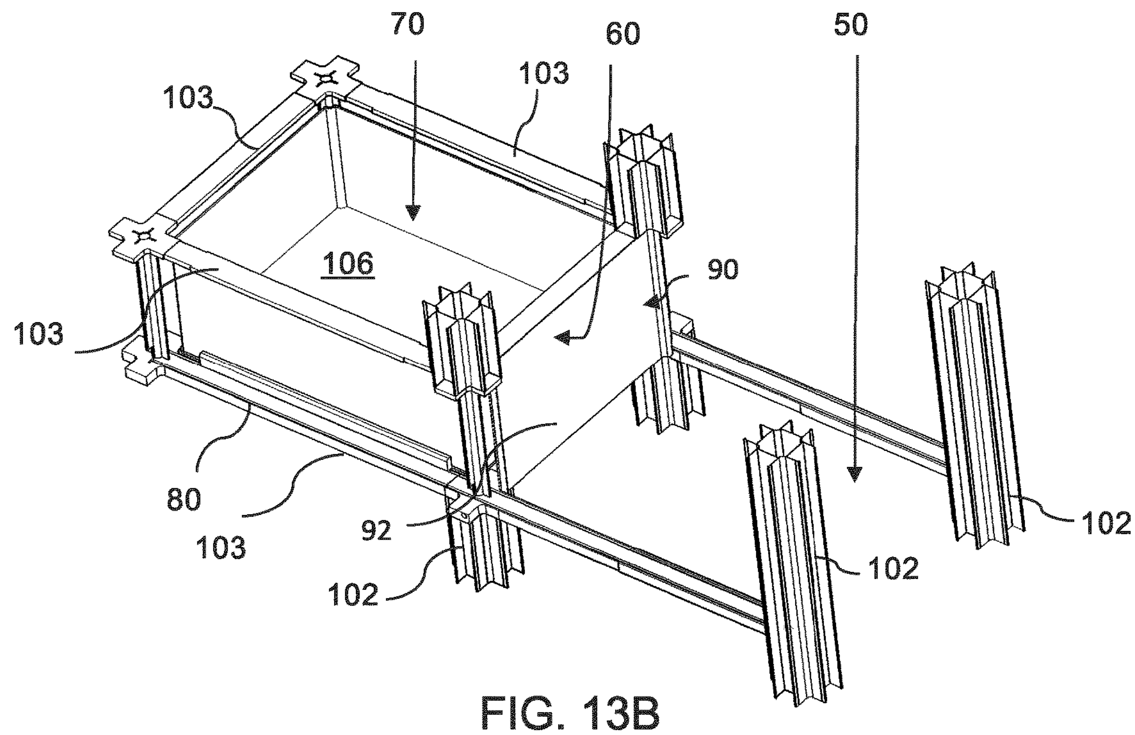

FIGS. 13A-13B show a fourth embodiment of the blocker 90. The blocker 90 comprises an obstruction member 92 arranged at a lower part of the side opening 60 and the side opening 60 is at a short side of the transfer column 50. A pivot axis of the obstruction member 92 extends horizontally along the short side and the obstruction member 92 is rotatable about the horizontal axis for movement of the blocker 90 between the first position and the second position.

Both in FIGS. 13A and 13B the blocker 90 is in the first position. In FIG. 13A, the supports 80 of the storage position 81 supports a storage container 106 and the obstruction member 92 of the blocker 90 guides a lifting device 16 of a container handling vehicle carrying a storage container 106 which is being lifted or lowered in the transfer column 50. In FIG. 13B, the storage container 106 in the transfer column 50 has been removed to better illustrate the obstruction member 92. The blocker 90 may be motor-driven such that upon actuation of a motor, the blocker 90 can move between the first position and the second position, and vice versa, thereby blocking the side opening 60 and allowing a storage container 106 to pass through the side opening 60. Alternatively, the blocker 90 can be spring-loaded such that it returns to the first or second position after being forced into the other of said positions.

FIGS. 14A-14D show a fifth embodiment of the blocker 90. In this embodiment, the blocker 90 comprises an obstruction member 92 and a pivot axis of the obstruction member 92 extends horizontally along the short side and the obstruction member 92 is rotatable about the horizontal axis for movement of the blocker 90 between the first position and the second position. The obstruction member 92 of the blocker 90 is connected to a horizontally movable support 80 of the storage position 81, and the storage position 81 comprises a shifter (not shown) for moving the support 80, and thus the blocker 90 between its first position and the second position, by moving the support 80 between the adjacent column 70 and the transfer column 50 through the side opening 60.

Figure 14A:
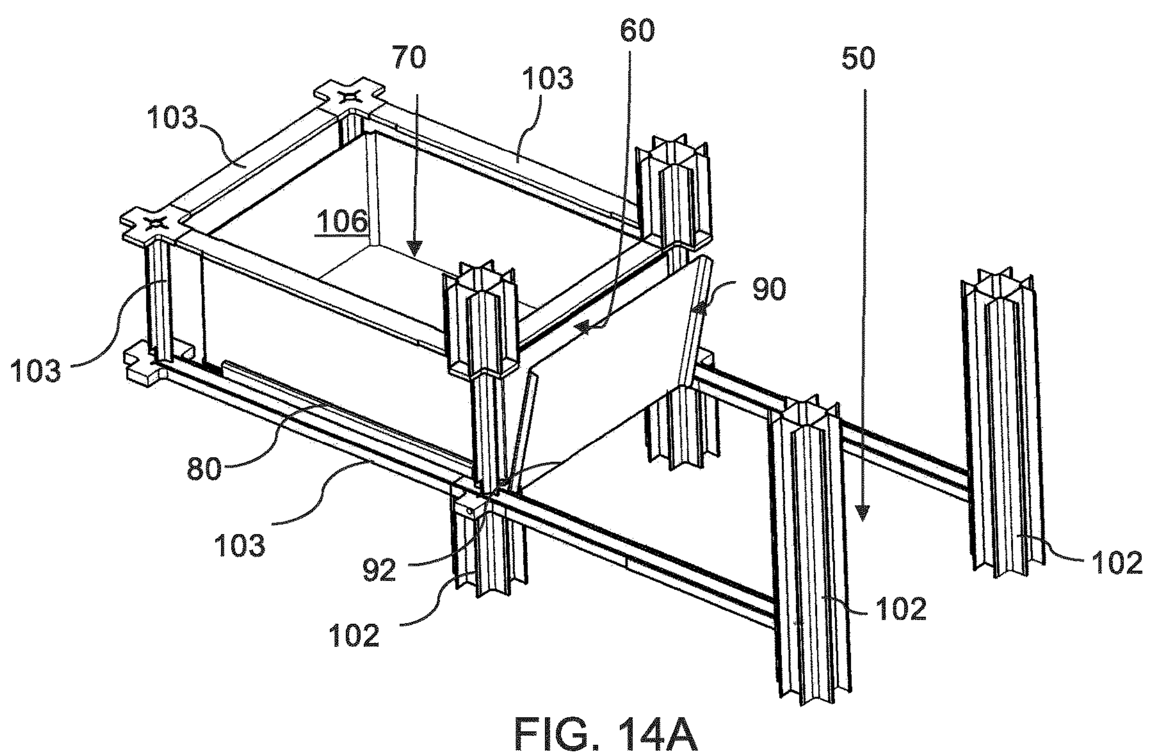
FIGS. 14A-14D show a fifth embodiment of the blocker, where the blocker comprises an obstruction member and wherein a pivot axis of the obstruction member extends horizontally along the short side and the obstruction member is rotatable about the horizontal axis for movement between the first position and the second position connected to a horizontally movable support, the blocker is connected to a horizontally movable support, and the storage position comprises a shifter for moving the support and the blocker between the first position and the second position by moving the support between the adjacent column and the transfer column through the side opening; where in FIG. 14A the support has started to move from the adjacent column towards the transfer column resulting in that the blocker is about to enter the second position, and in FIG. 14B the support has moved further towards the transfer column and the blocker is in the second position, and in FIG. 14C the support with the storage container has moved to the transfer column.

In FIG. 14A, the support 80 of the storage position 81 with storage container 106 thereon has started to move from the adjacent column 70 towards the transfer column 50 resulting in that the blocker 90 is about to enter the second position.

Figure 14B:
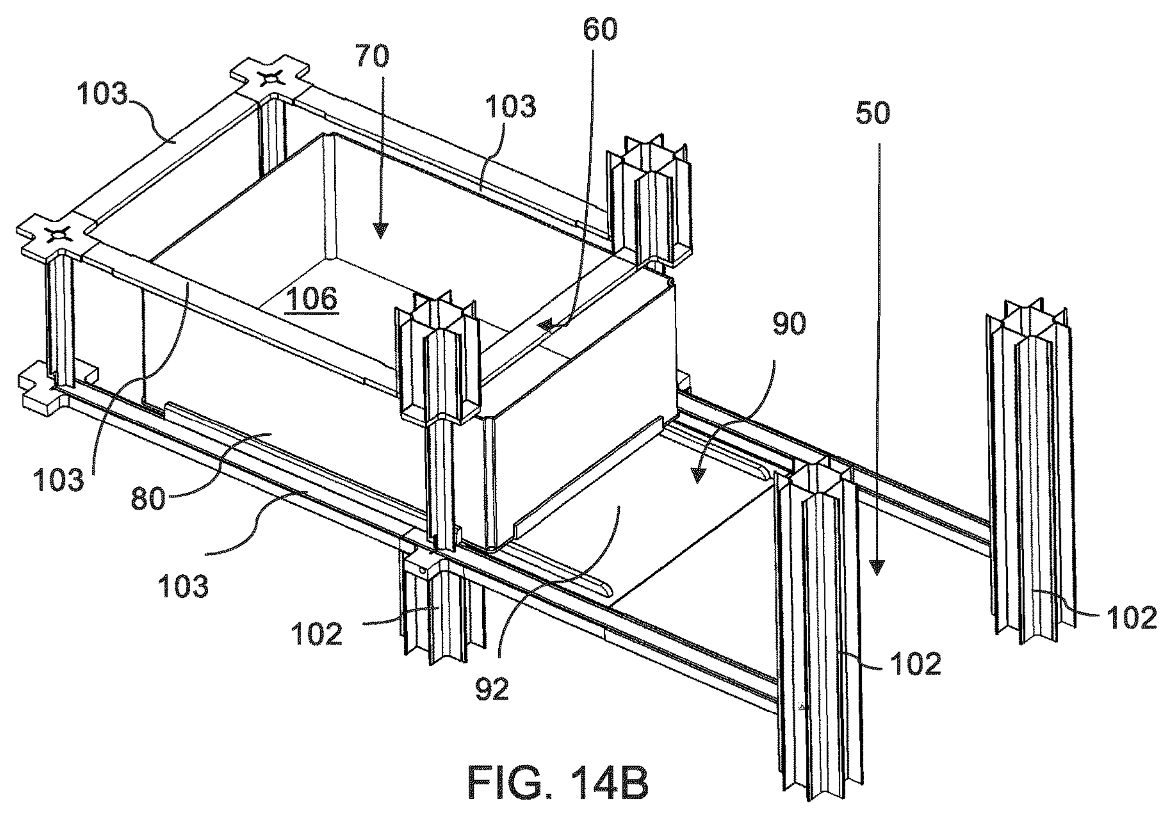

In FIG. 14B, the support 80 of the storage position 81 and storage container 106 have moved further towards the transfer column 50 and the blocker 90 is in the second position.

Figure 14C:
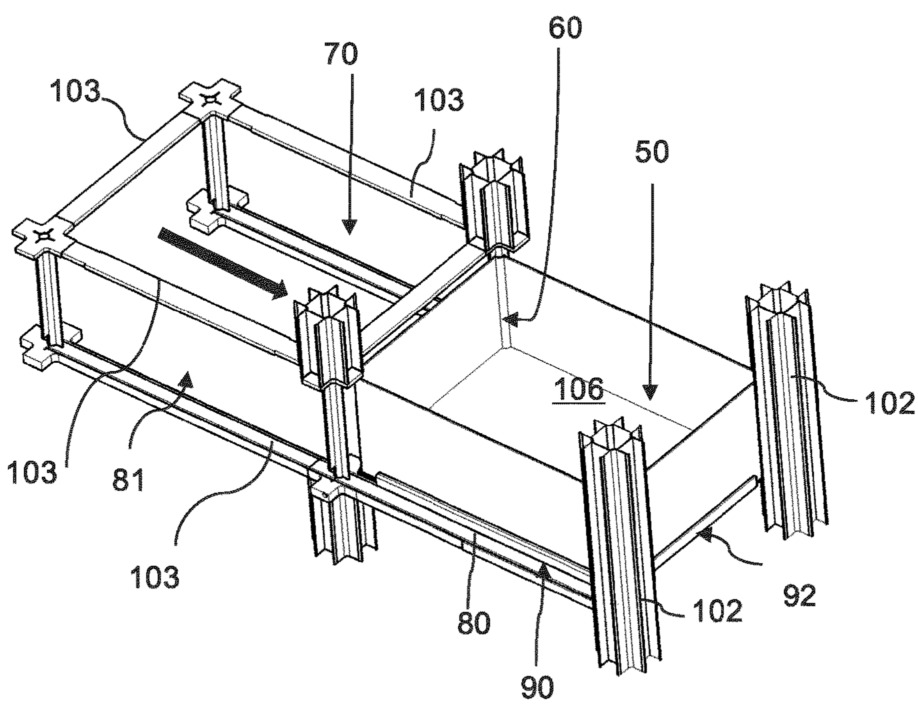

In FIG. 14C the support 80 and storage container 106 have moved to the transfer column 50.

The storage position 81 may comprise a shifter or ball screw device for moving the blocker 90 linearly between the first position and the second position by moving the support 80 between the adjacent column 70 and the transfer column 50 through the side opening 60.

Figure 14D:
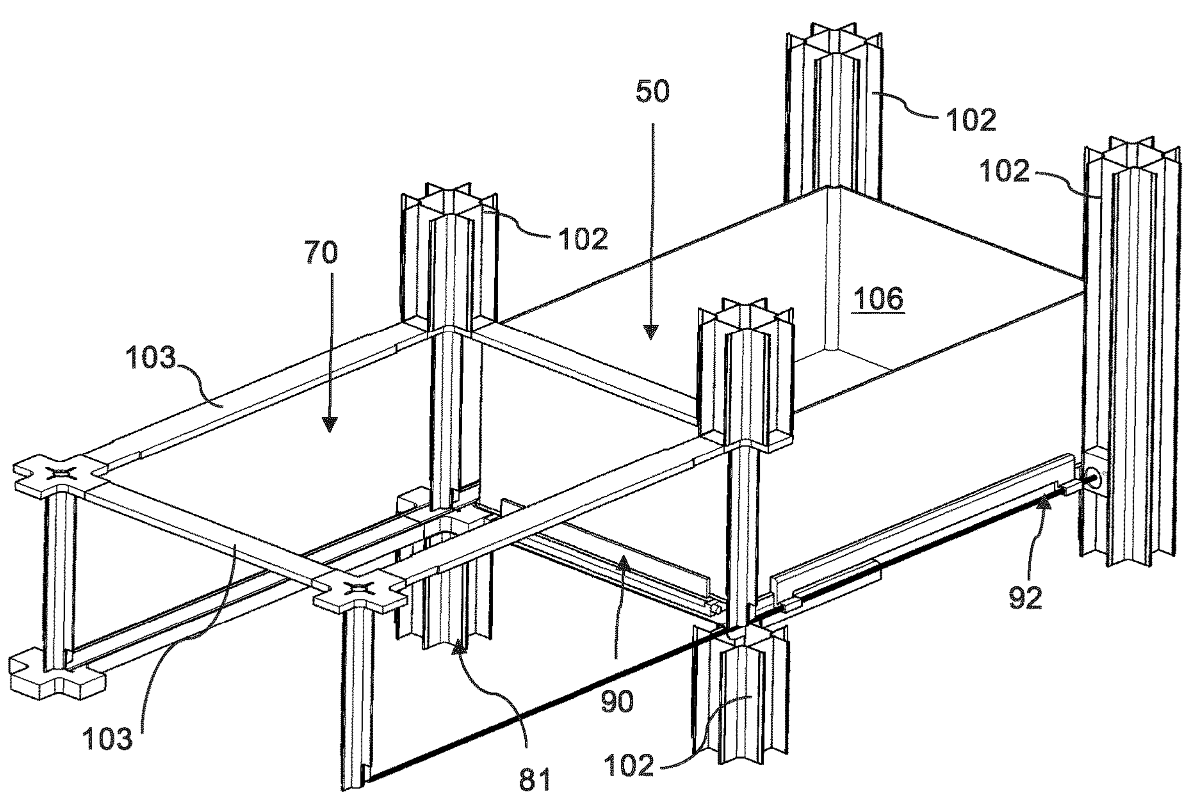

FIG. 14D is a view from the opposite side compared to FIG. 14C.

FIGS. 15A-15E show a lifting device 16 of a container handling vehicle 301, wherein the lifting device 16 comprises a main part 17 connected with lifting bands 18 to a body of the container handling vehicle 301 and a horizontally telescopic part 19 comprising a gripper 20. The main part 17 may comprise stabilizing means (not shown) for keeping the lifting device 16 stable in the transfer column 50 during extension of the telescopic part 19. The stabilizing means are described in greater detail when referring to FIGS. 16A and 16B below.

The lifting bands 18 may have means for signal and communication transmission between the container handling vehicle and the lifting device 16.

The horizontal telescopic part 19 may be configured to move between a retracted position below the main part 17 and an extended position outside a vertical projection of the main part 17. In the embodiments described herein, the telescopic part 19 is typically extendable into an adjacent column 70 for retrieving or positioning a storage container 106 on supports 80 of a storage position 81 in the adjacent column 70.

Figure 15A:
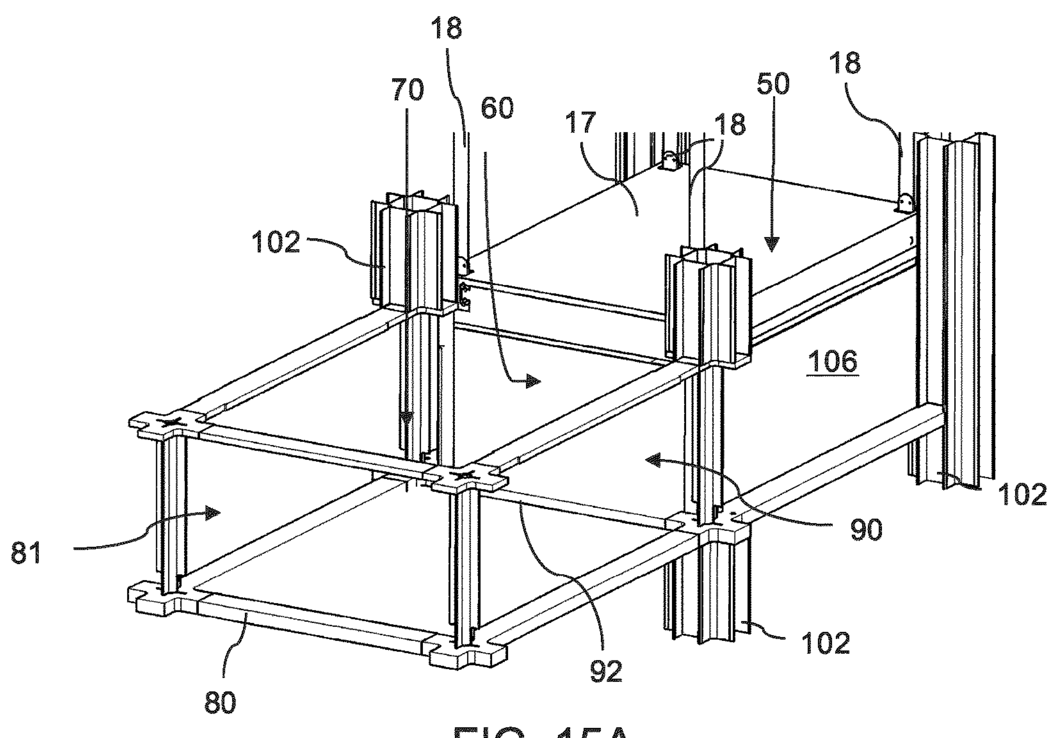
FIGS. 15A-15E show a lifting device of a container handling vehicle, wherein the lifting device comprises a main part connected with lifting bands to a body of the container handling vehicle and a horizontally telescopic part comprising a gripper, and wherein the horizontal telescopic part is configured to move between a retracted position below the main part and an extended position outside a vertical projection of the main part, where in FIG. 15A the horizontally telescopic part is in the retracted position, in FIG. 15B the horizontally telescopic part is in the extended position, in FIG. 15C a storage container is supported by supports of a storage position and the transfer column is empty, in FIG. 15D the lifting device has entered the transfer column and the telescopic part is in the extended position above the storage container, in FIG. 15E the lifting device has been lowered such that the grippers of the telescopic part have engaged gripping holes on the storage container positioned at the storage position and the telescopic part can now retract to the retracted position while carrying the storage container.

In FIG. 15A the horizontally telescopic part 19 is in the retracted position.

Figure 15B:
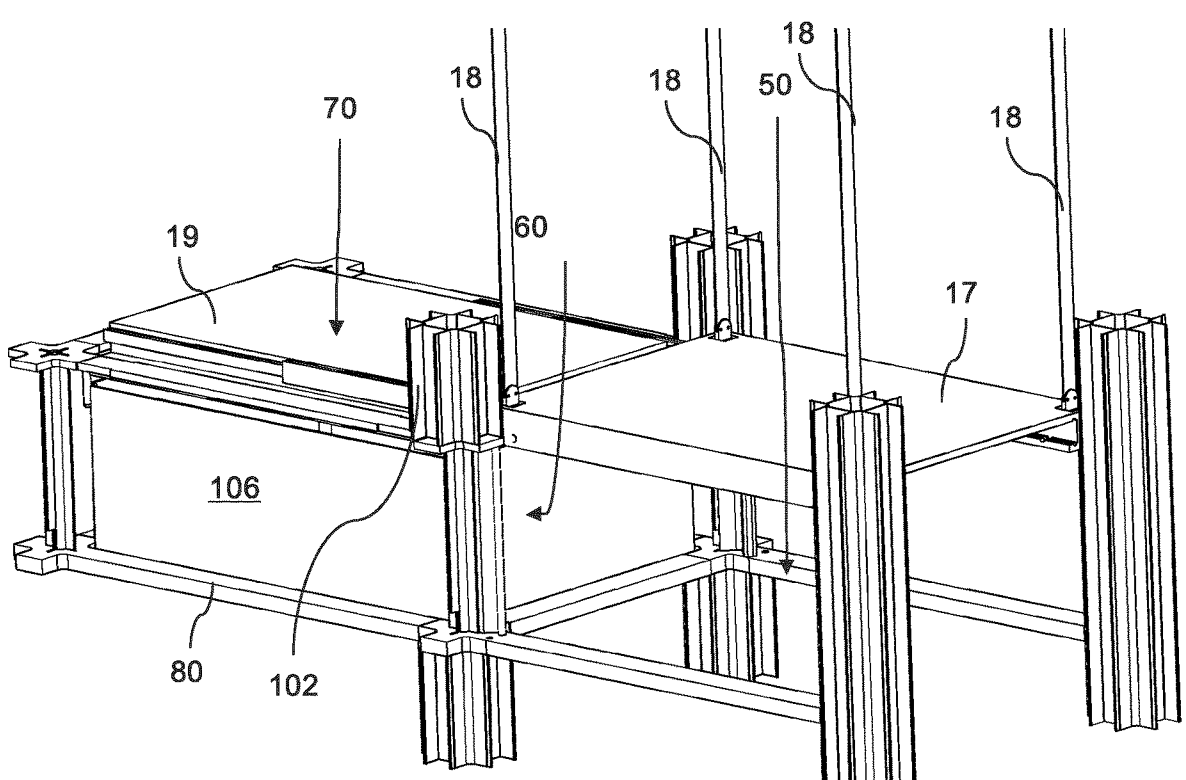

In FIG. 15B the horizontally telescopic part 19 is in the extended position.

Figures 15C, 15D, 15E:
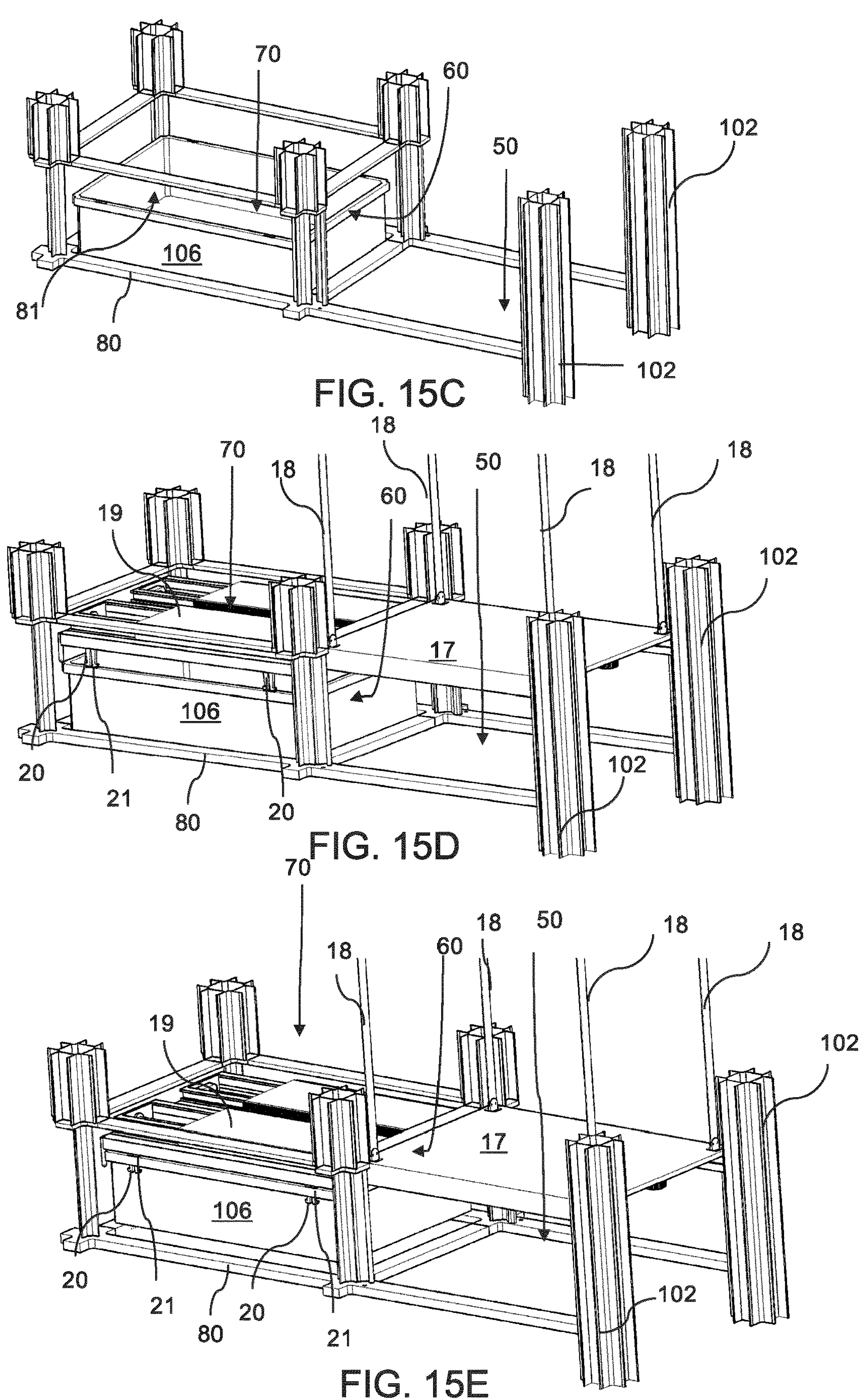

In FIG. 15C a storage container 106 at a storage position 81 is shown and the transfer column 70 is empty.

In FIG. 15D the lifting device 16 has entered the transfer column 50 and the telescopic part 19 is in the extended position above the storage container 106.

In FIG. 15E the lifting device 16 has been lowered such that the grippers 20 of the telescopic part 19 have engaged gripping holes 21 on the storage container 106 positioned at the storage position 81 and the telescopic part 19 can now retract to the retracted position under the main part 17 while carrying the storage container 106

Referring to FIGS. 15A-15E, a sequence of positioning a storage container 106 at a storage position 81 in an adjacent column 70 could then comprise the steps of:

Lower down lifting device 16 with storage container 106 to desired position.

Optional: Activate stabilizing means sideways into contact with vertical members.

Extend the telescopic part 19, the stabilizing means will now support the entire lifting device 16 so that it does not tip forward and wedge due to the torque from a storage container 106 carried by the extended telescopic part 19.

When the telescopic part 19 is extended, lower the lifting device 16 such that the storage container 106 is placed at the storage position 81.

Detach the storage container 106 from the grippers 20 of the telescopic part 19.

Lift the lifting device 16 upwards until the grippers 20 are clear of the storage container 106.

Retract the telescopic part 19 into its position under the main part 17.

Optional: retrieve a storage container 106 stored in another storage position 81 using the sequence above or retrieve the lifting device 16 to the body of the container handling vehicle 301.

Figure 16A:
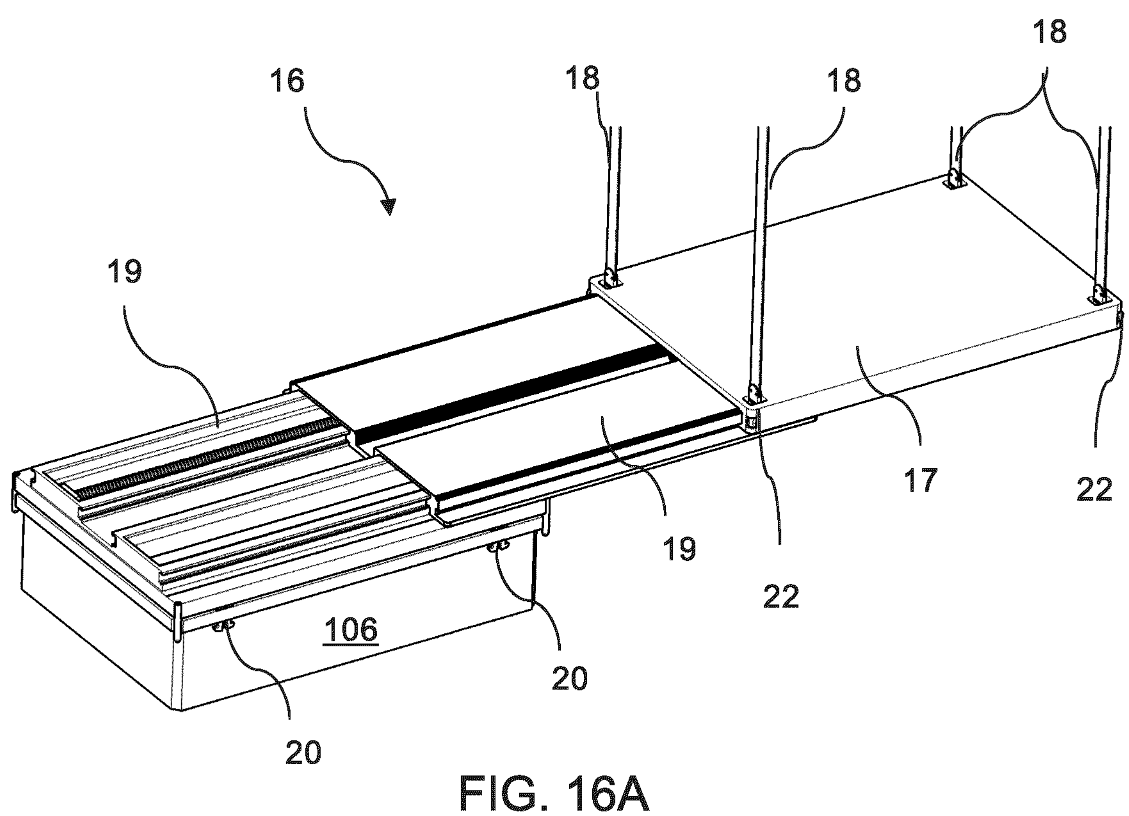
FIGS. 16A and 16B are perspective views of an example moving mechanism for moving the telescopic part between the retracted position and the extended position in addition to stabilizing means on the main part for securing the main part in the transfer column during extension of the telescopic part to prevent tilting of the lifting device; where in FIG. 16A the telescopic part is in a fully extended position, and in FIG. 16B the telescopic part is partly extended.
Figure 16B:
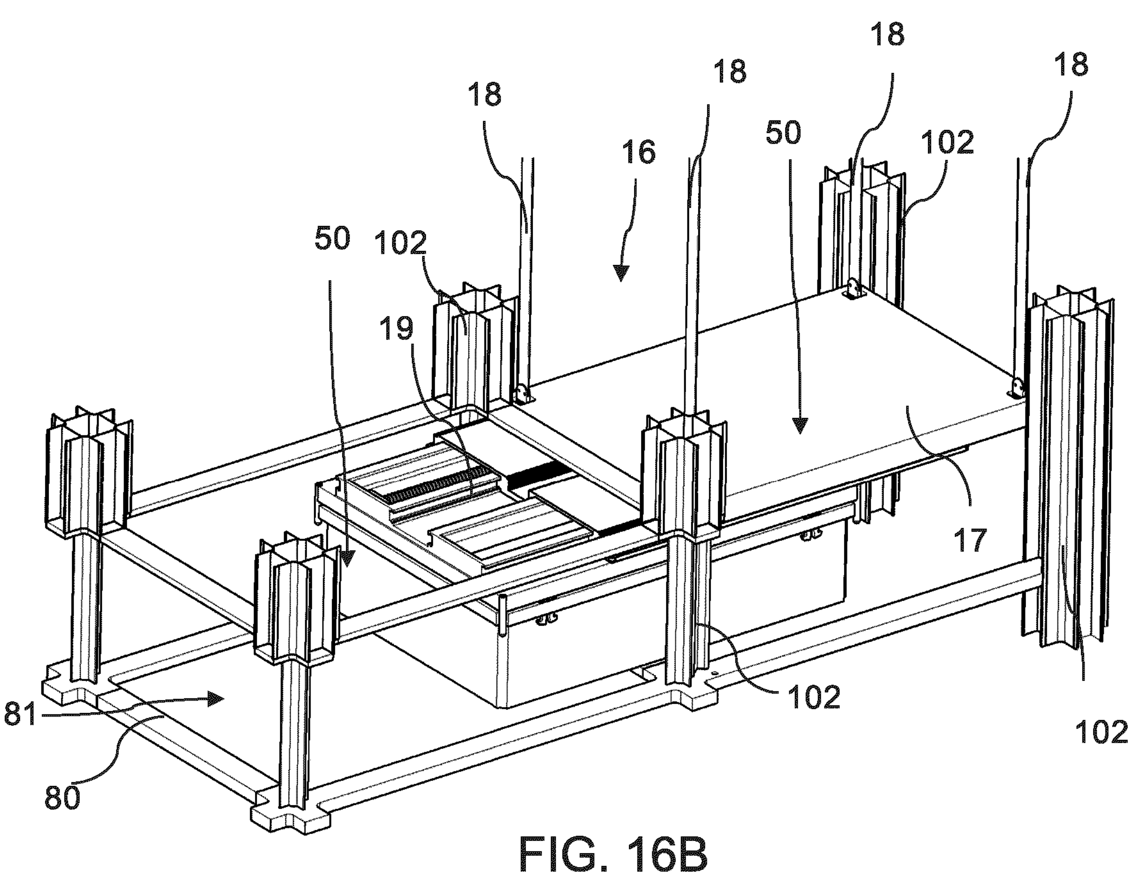

FIGS. 16A and 16B are perspective views of an example moving mechanism for moving the telescopic part 19 between the retracted position and the extended position. In addition, the figures show stabilizing means on the main part 17 for securing the main part 17 in the transfer column 50 during extension of the telescopic part 19 to prevent tilting of the lifting device 16.

In FIG. 16A the telescopic part 19 is in a fully extended position, and in FIG. 16B the telescopic part 19 is partly extended.

Figure 17A:
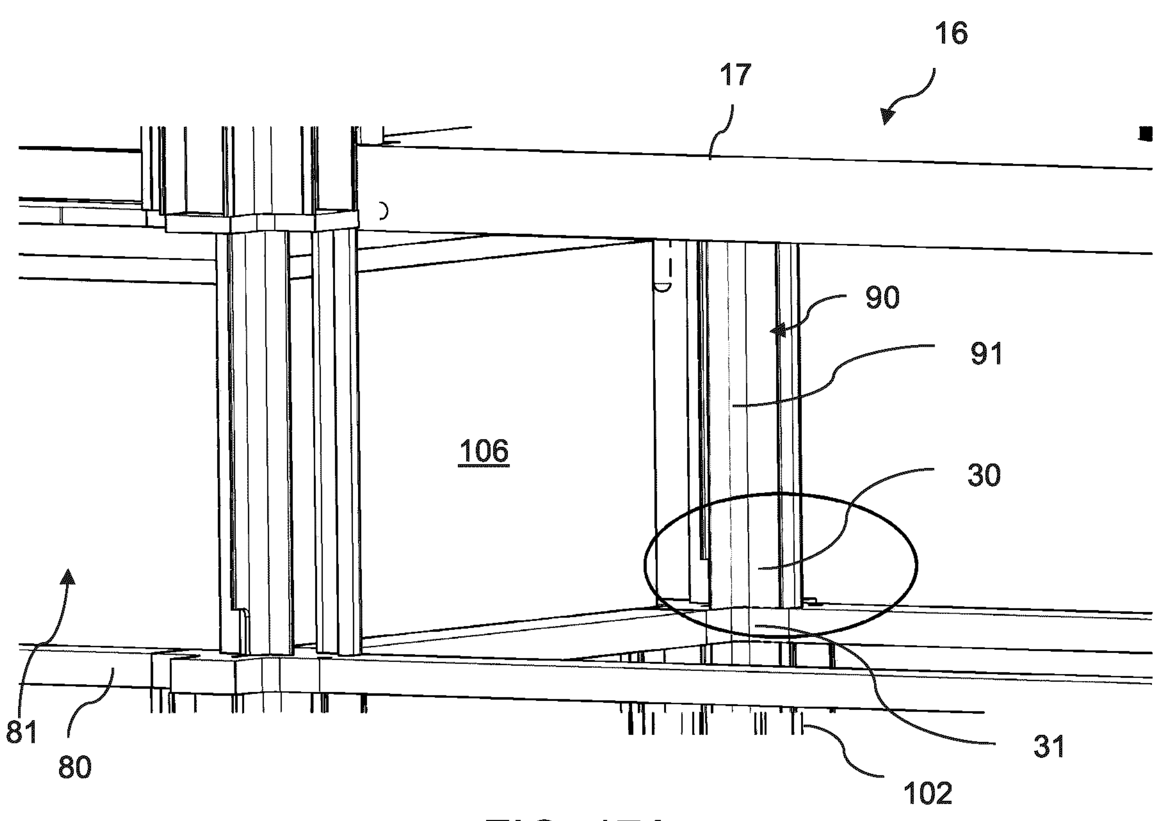
FIGS. 17A and 17B show an example of the blocker with a vertical rotational axis, where the blocker can be moved between the first position and the second position upon movement of the telescopic lifting device in FIGS. 15A-15E and 16A and 16B, where in FIG. 17A the blocker is in the first position, and in FIG. 17B the blocker is in the second position.
Figure 17B:
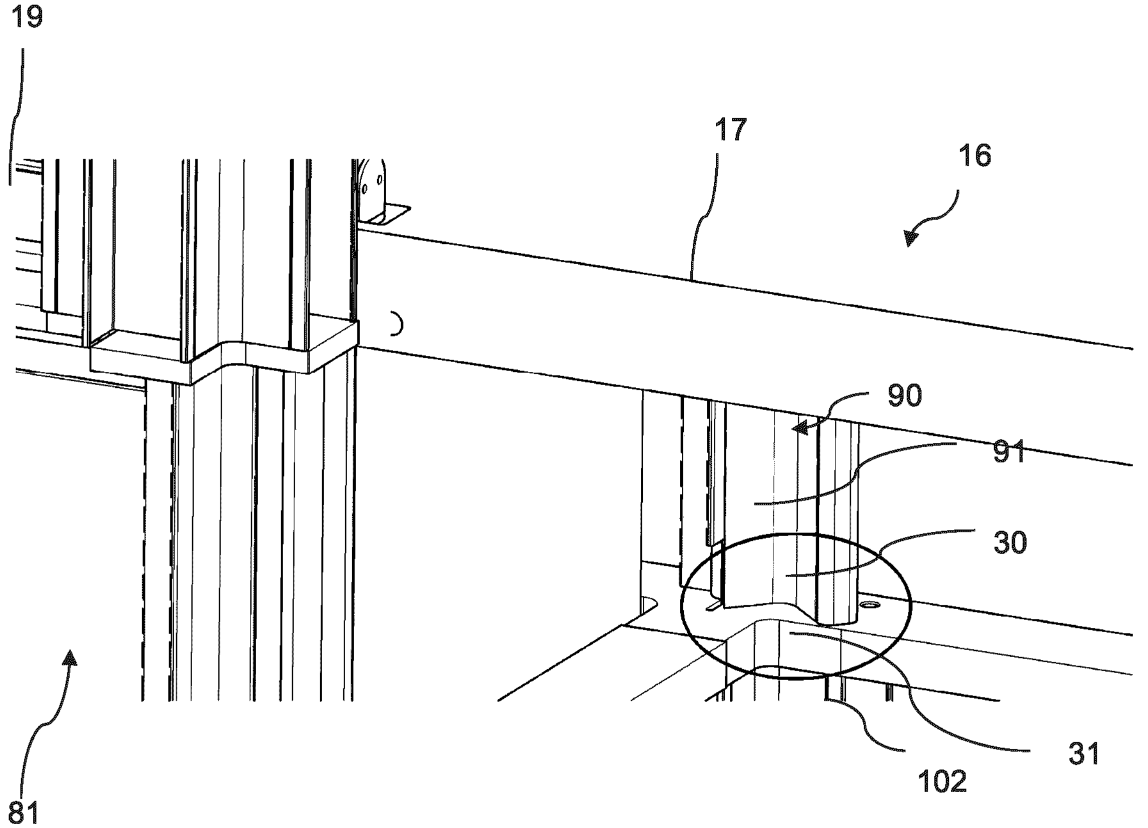

FIGS. 17A and 17B show an example of the blocker 90 with an obstruction member 91 having a vertical rotational axis, where the blocker 90 can be moved between the first position and the second position upon movement of the telescopic part 19 of the lifting device 16 in FIGS. 15A-15E and 16A and 16B.

In FIG. 17A the blocker 90 is in the first position in that an inner surface 30 of obstruction member 91 aligned with a recess 31 in the upright member 102. The telescopic part 19 is in the retracted position under the main part 17 of the lifting device 16.

In FIG. 17B the blocker 90 is in the second position in that the inner surface 30 of the obstruction member 91 is out of alignment with the recess 31 in the upright member 102. In this position, the telescopic part 19 of the lifting device is in the extended position and extends into the storage position 81 of an adjacent column.

Figure 18:
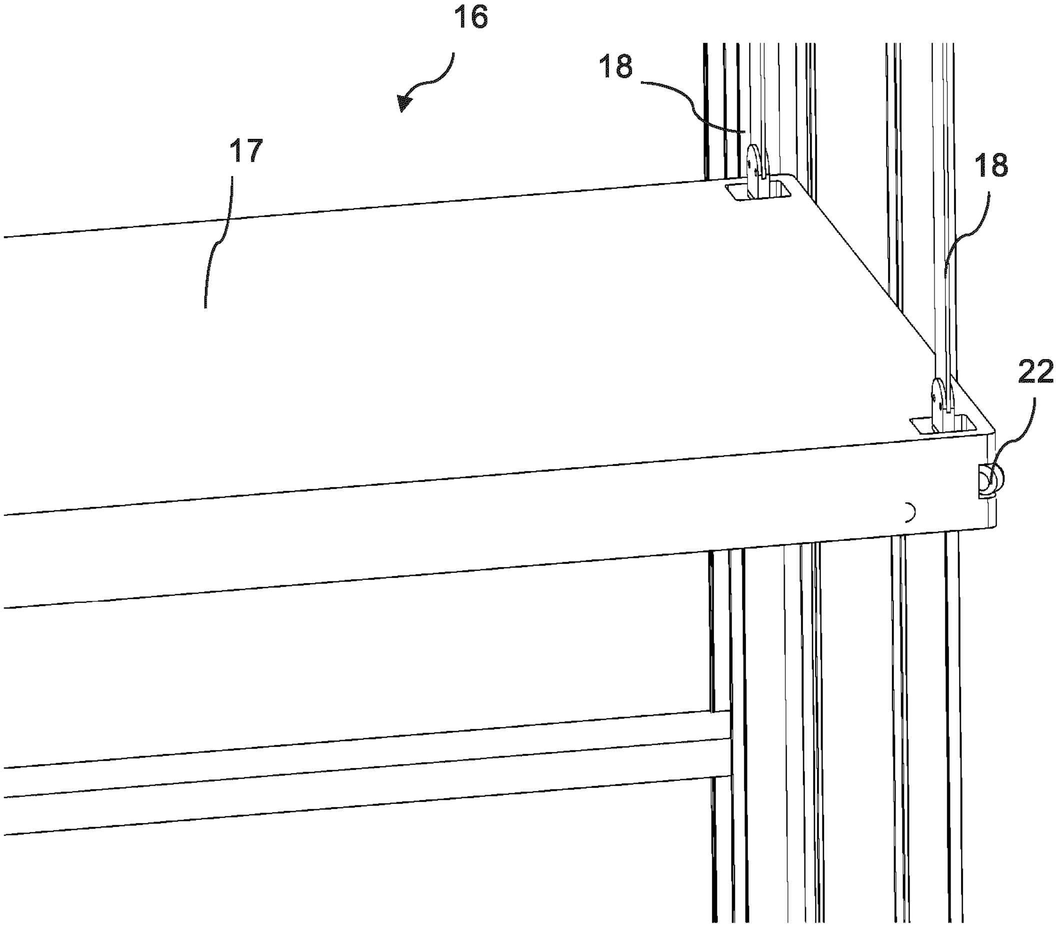
FIG. 18 shows details of the main part of the lifting device with stabilizing means in the corners for securing the main part in the transfer column during extension of the telescopic part to prevent tilting of the lifting device.

FIG. 18 shows details of the main part 17 of the lifting device 16 with stabilizing means 22 in the corners for securing the main part 17 in the transfer column 50 during extension of the telescopic part 19 to prevent tilting of the lifting device 16.

Figure 19:
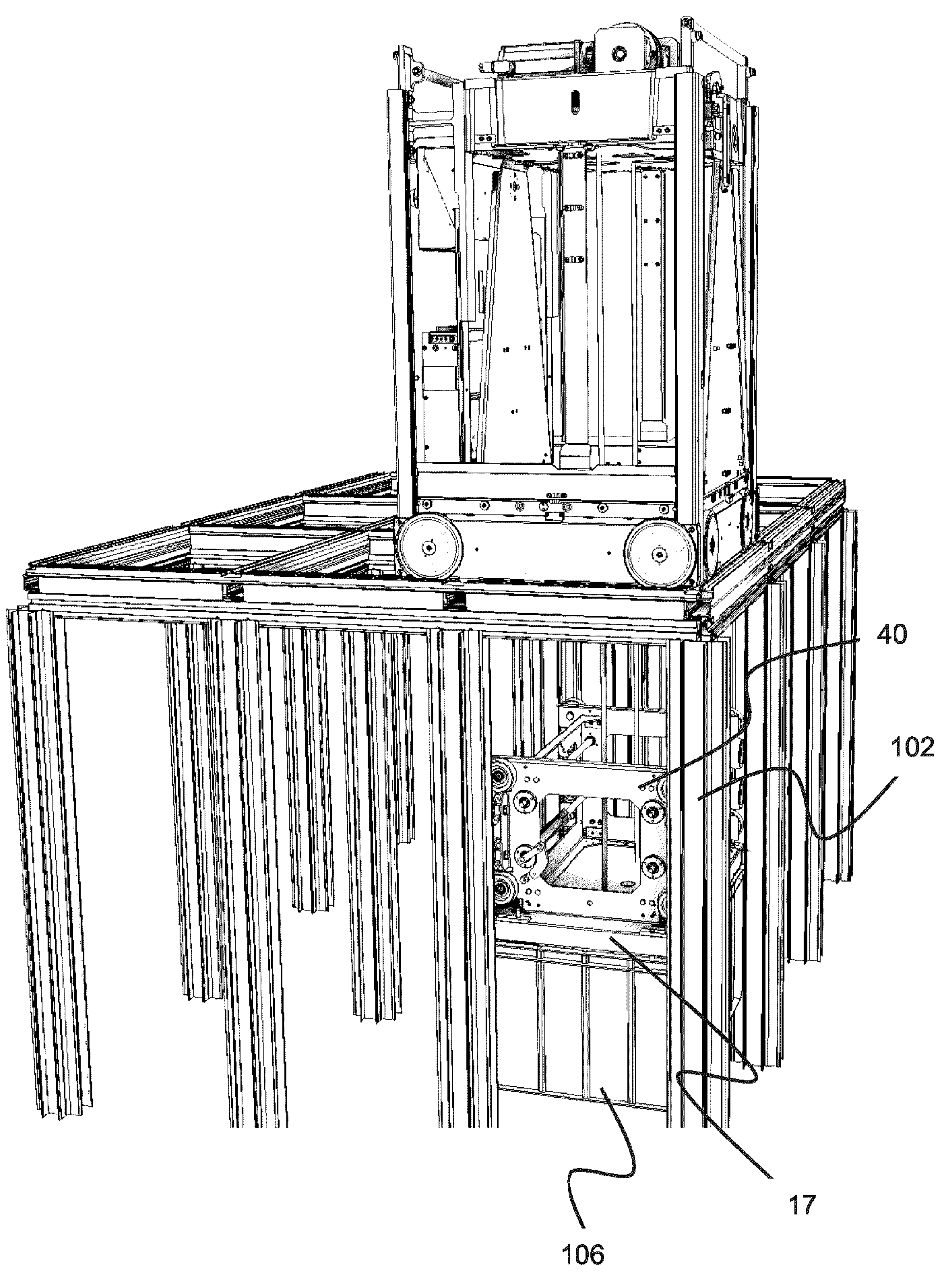
FIG. 19 is a copy of FIG. 13 in WO2020/200631A1 (Applicant: AutoStore Technology AS) included to illustrate an alternative way of stabilizing the main part (lifting frame) of the lifting device in the transfer column, where a guide shuttle comprising stabilizing wheels for interaction with the upright members is mounted above the main part.

FIG. 19 is a copy of FIG. 13 in WO2020/200631A1 (Applicant: AutoStore Technology AS, reference numbers amended compared to WO2020/200631A1) included to illustrate an alternative way of stabilizing the main part 17 in the transfer column, where a guide shuttle 40 comprising stabilizing wheels for interaction with the upright members 102 are mounted above the main part 17.

Figure 20A:
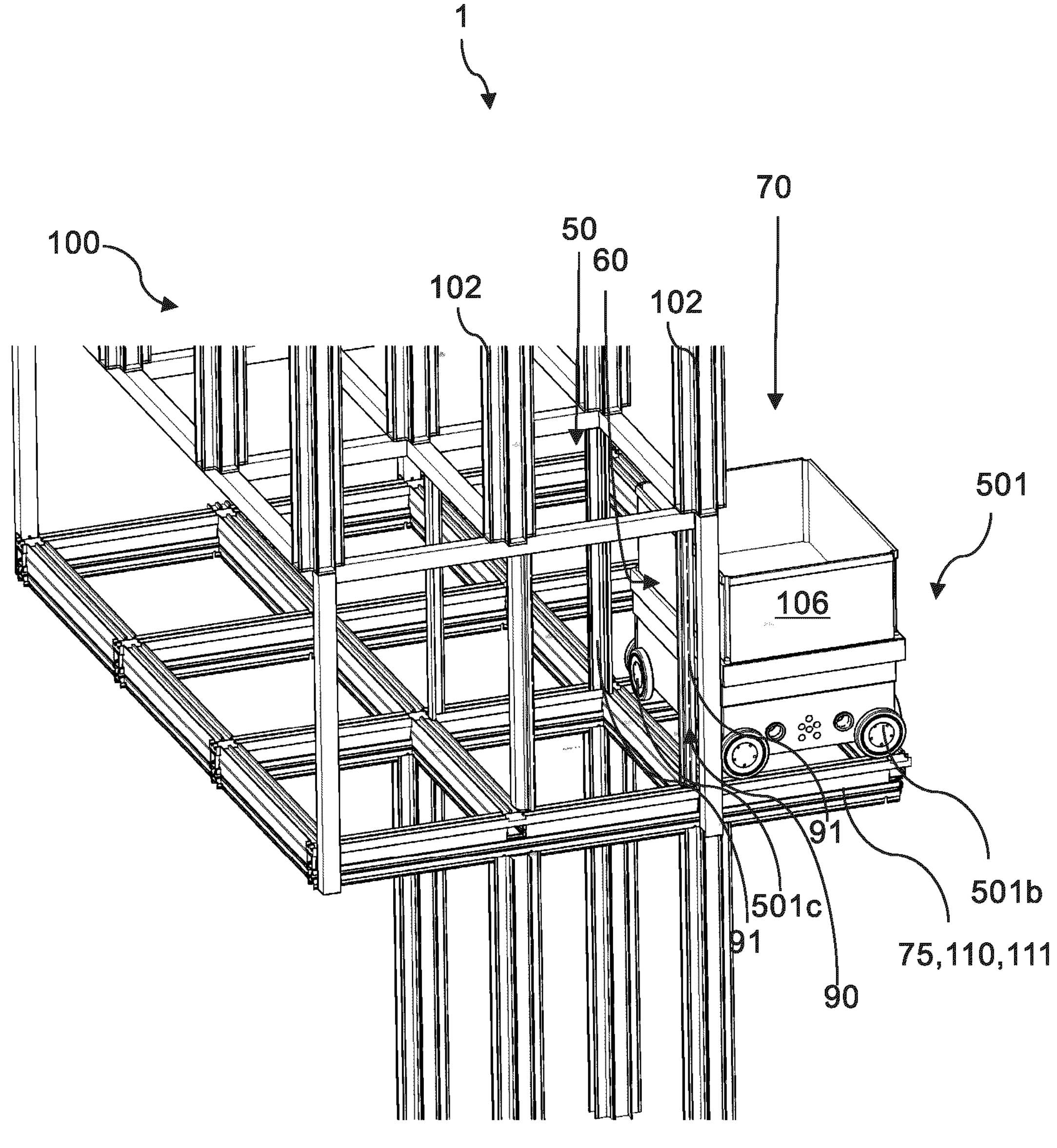
FIGS. 20A-20C show an example of an automated storage system and retrieval system further comprising a an additional rail system at a lower elevation than the top of the framework structure (100) where a delivery vehicle with a support surface operates on the additional rail system, and wherein the side opening with a blocker opens towards the additional rail system, and where
Figures 20B, 20C:
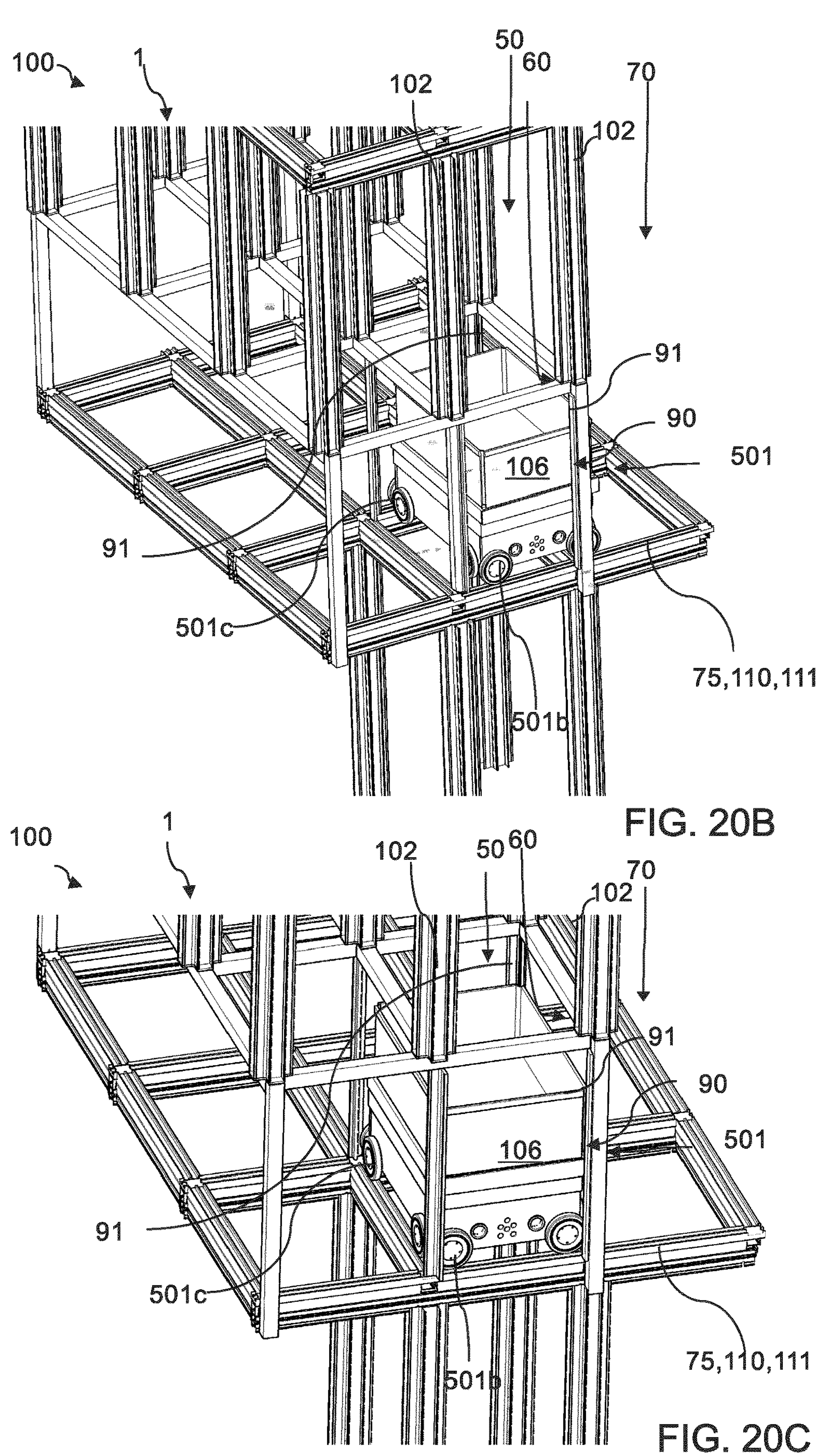

FIGS. 20A-20C show an example of an automated storage system and retrieval system 1 further comprising an additional rail system 75 at a lower elevation than the top of the framework structure 100 where a delivery vehicle 501 with a support surface for supporting a storage container 106 from below operates on the additional rail system 75. The additional rail system 75 may be configured in the same way as the rail system 108 on top of the framework structure 100. i.e. the additional rail system 75 may comprise a first set of parallel rails 110 arranged to guide movement of the delivery vehicle(s) 501 in a first direction X, and a second set of parallel rails 111 arranged perpendicular to the first set of rails 110 to guide movement of the delivery vehicle(s) 501 in a second direction Y which is perpendicular to the first direction X. The position and spacing of the rails of the additional rail system may correspond to the rail system 108 of the framework structure 100. The delivery vehicle(s) 501 can move laterally in a plane which is parallel to the horizontal X-Y plane.

The delivery vehicle 501 is disclosed with a vehicle body 501*a* and first and second sets of wheels 501*b*,501*c* which enable the lateral movement of the delivery vehicles 501 in the X direction and in the Y direction, respectively. The first set of wheels 501*b* is arranged to engage with two adjacent rails of the first set 110 of rails, and the second set of wheels 501*c* is arranged to engage with two adjacent rails of the second set 111 of rails. At least one of the sets of wheels 501*b*,501*c* can be lifted and lowered, so that the first set of wheels 501*b* and/or the second set of wheels 501*c* can be engaged with the respective set of rails 110, 111 at any one time.

A blocker 90 comprising a pair of obstruction members 91 is arranged in the side opening 60. The side opening 60 is arranged between the transfer column 50 and the additional rail system 75. FIG. 20A shows the delivery vehicle 501 on the additional rail system 75 outside of the transfer column 50, FIG. 20B shows the delivery vehicle 501 about to enter the transfer column 50 through the side opening 60. The delivery vehicle 501 may be configured to move the blocker 90 between the first and second position when entering through the side opening 60. In FIG. 20C the delivery vehicle 501 is within the transfer column 50 ready for transferring a storage container 106 to, or receiving a storage container 106 from, a lifting device 16 of a container handling vehicle 301 operating on the rail system (not shown in FIGS. 20A-20C) on top of the framework structure 100.

Figure 21:
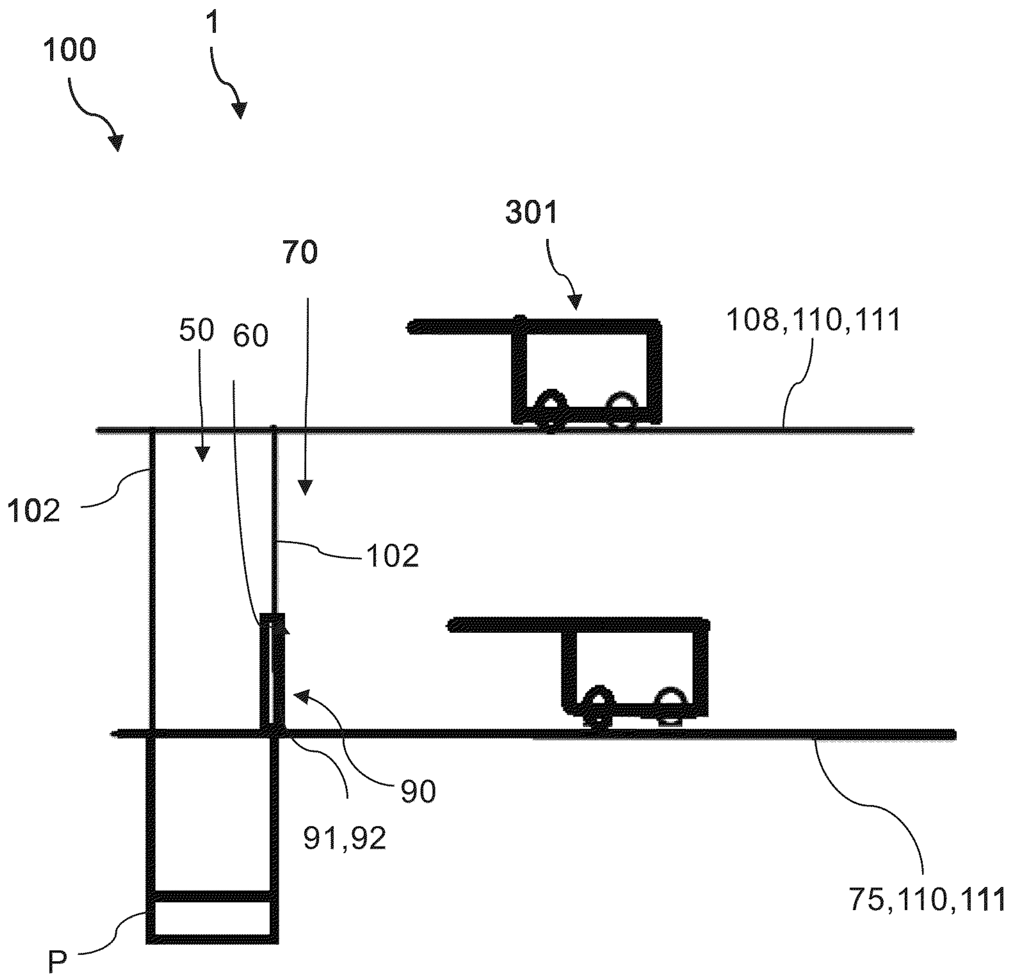
FIG. 21 shows another example of an automated storage system and retrieval system comprising an additional rail system at a lower elevation than the top of the framework structure (100) where a container handling with a lifting device operates on the additional rail system outside of the transfer column, and wherein the side opening with a blocker opens towards the additional rail system.

FIG. 21 shows another example of an automated storage system and retrieval system 1 comprising an additional rail system 75 at a lower elevation than the top of the framework structure 100 where a container handling vehicle 301 with a lifting device operates on the additional rail system 75 outside of the transfer column 50. The side opening 60 comprises a blocker 90 which opens towards the additional rail system 75. The additional rail system 75 may be similar as described above in relation to FIGS. 20A-20C and will not be repeated herein. Similarly, the blocker 90 may comprise a pair of obstruction members 91 on opposite edges of the side opening 60 or it may comprise an obstruction member 92 which is rotatable about horizontal axis. Further, the blocker 90 may be arranged to be moved between the first position by means of a motor arrangement. Alternatively, the blocker may be configured to be moved between the first and second position upon interaction with the container handling vehicle 301 passing into the side opening 60. Typically, the blocker 90 may be in the first position and, when the container handling vehicle 301 enters the side opening 60, the blocker 90 may be in the second position. When the container handling vehicle 301 has delivered or retrieved a storage container to a position further down in the transfer column 50, such as e.g. a port P, it exits the side opening 60 and the blocker 90 returns to the first position. The blocker 90 may return to the first position by means of e.g. a motor or a spring force.

Figures 22A, 22B, 22C:
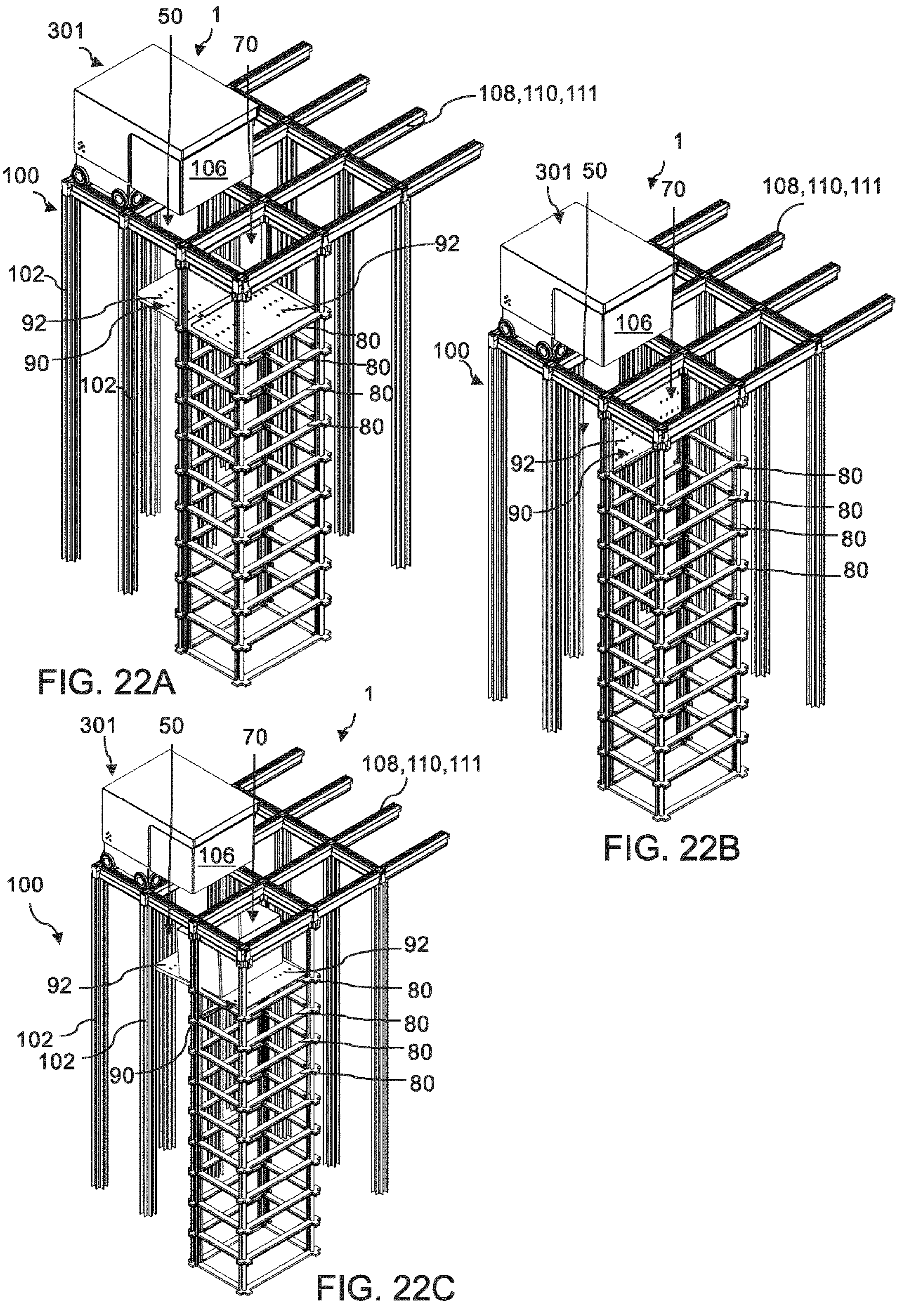
FIGS. 22A-22C show an example of the blocker in FIGS. 9A-9D, comprising two obstruction members arranged at a lower part of the side opening and wherein the side opening is at a long side of the transfer column, wherein a pivot axis of the obstruction members extend horizontally and the obstruction members are rotatable about the horizontal axis for movement between the first position and the second position and wherein the blocker is arranged such that one of the obstruction members extends into the storage position when in the second position and the other of the obstruction members extend into the transfer column when in the second position, where

FIGS. 22A-22C show an example of the blocker in FIGS. 9A-9D, comprising two obstruction members 92 arranged at a lower part of the side opening 60 and wherein the side opening 60 is at a long side of the transfer column 50. A pivot axes of the obstruction members 92 extend horizontally and the obstruction members 92 are rotatable about one of the horizontal axes for movement of the blocker 90 between the first position and the second position. The blocker 90 is arranged such that one of the obstruction members 92 extends into the storage position 81 when in the second position and the other of the obstruction members 92 extend into the transfer column 50 when in the second position.

FIG. 22A shows the blocker 90 in the second position where the obstruction members 92 extend into the storage position 81 and the transfer column 50, respectively.

FIG. 22B shows the blocker 90 in the first position where both obstruction members 92 extend vertically and block the side opening 60.

FIG. 22C shows that a storage container 106 is supported on the obstruction members 92 and where the obstruction members 92 are tilted such that the storage container 106 can move between the storage position 81 and the transfer column 50 by means of gravity. The blocker 90 may comprise a motor and/or movement mechanism (not shown) for tilting of one or both of the obstruction members 92.

In the preceding description, various aspects of the automated storage and retrieval system and method according to the invention have been described with reference to the illustrative embodiment. For example, as indicated above, in the Figures a storage container has been shown, however other kinds of goods holders such as a bin, a tote, a pallet, a tray or similar may be used instead.

For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention as defined in the attached claims.

LIST OF REFERENCE NUMBERS

1 Automated storage and retrieval system
1' First subsystem
1" Second subsystem
16 Lifting device
17 Main part (lifting frame)
18 Lifting bands
19 Telescopic part
20 Gripper
21 Gripping holes on storage container
22 Stabilizing means/rollers
30 Inner surface of obstruction member
31 Recess of upright member
40 Guide shuttle
50 Transfer column
60 Side opening
70 Adjacent column
75 Additional rail system
80 Supports
81 Storage position
89 Friction reducing means/rollers
90 Blocker
91 Pair of obstruction members (rotatable about vertical axis)
92 Obstruction member (rotatable about horizontal axis)/plate
93 Support portion
94 Angled gear, first part/worm gear
95 Angled gear, second part/worm gear
96 Motor
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110*a* First rail in first direction (X)
110*b* Second rail in first direction (X)
111 Parallel rail in second direction (Y)
111*a* First rail of second direction (Y)
111*b* Second rail of second direction (Y)
112 Access opening
119 First port column
120 Second port column
201 Prior art container handling vehicle
201*a* Vehicle body of the container handling vehicle 201
201*b* First set of wheels, first direction (X)
201*c* Second set of wheels, second direction (Y)
301 Prior art cantilever container handling vehicle
301*a* Vehicle body of the container handling vehicle 301
301*b* First set of wheels, first direction (X)
301*c* Second set of wheels, second direction (Y)
401 Prior art container handling vehicle
401*a* Vehicle body of the container handling vehicle 401
401*b* First set of wheels, first direction (X)

401*c* Second set of wheels, second direction (Y)
501 Delivery vehicle
P Port
X First direction
Y Second direction
Z Third direction

The invention claimed is:

1. An automated storage and retrieval system comprising a two-dimensional rail system comprising a first set of parallel rails arranged to guide movement of container handling vehicles in a first direction across the top of a framework structure, and a second set of parallel rails arranged perpendicular to the first set of rails to guide movement of the container handling vehicles in a second direction across the top of the framework structure which is perpendicular to the first direction, wherein a number of container handling vehicles operate on the rail system for storing and retrieving goods holders in the automated storage and retrieval system, and wherein the framework structure comprises:
   a transfer column comprising a side opening for a goods holder to pass through,
   an adjustable blocker for obstructing the side opening, the blocker comprising a guiding surface for guiding a lifting device of a container handling vehicle vertically in the transfer column past the side opening, wherein the blocker is movable between:
   a first position, where the guiding surface is positioned to guide the lifting device vertically and obstruct horizontal movement of a goods holder through the side opening, and
   a second position, where the guiding surface is positioned not to guide the lifting device and where the blocker is positioned to allow horizontal movement of a goods holder through the side opening.

2. The system according to claim 1, wherein the side opening opens towards an adjacent column.

3. The system according to claim 2, wherein the adjacent column comprises a plurality of vertically spaced storage positions comprising supports for supporting goods holders.

4. The system according to claim 3, wherein the supports of the storage positions are adjustable between a position where they are configured to support a goods holder and a position where a goods holder is allowed to pass vertically through the storage position.

5. The system according to claim 3, wherein the blocker comprises a pair of first and second obstruction members arranged at opposite edges of the side opening, wherein a pivot axis of each of the first and second obstruction members extends vertically, and wherein the obstruction members are rotatable about the axis for movement between the first and second positions, respectively.

6. The system according to claim 5, wherein the first and second obstruction members comprise a support portion extending into one of the storage positions when the blocker is in the second position such that the support portions can support a goods holder from below.

7. The system according to claim 3, wherein the supports of the storage positions are connected to the blocker, such that when the blocker is in the second position, the supports are in the position where they are configured to support a goods holder.

8. The system according to claim 3, wherein each storage position comprises a shifter for moving the blocker between the first position and the second position by moving the supports between the storage positions in the adjacent column and the transfer column through the side opening.

9. The system according to claim 1, wherein the framework structure comprises upright members delimiting the horizontal extent of the transfer column.

10. The system according to claim 9, wherein the framework structure further comprises horizontal members, and wherein the upright members and horizontal members form a rectangular frame defining a cross sectional area of the side opening.

11. The system according to claim 1, wherein the blocker comprises an obstruction member arranged at a lower part of the side opening, wherein a pivot axis of the obstruction member extends horizontally and the obstruction member is rotatable about the horizontal axis for movement between the first position and the second position, respectively.

12. The system according to claim 11, wherein the obstruction member is a plate, and wherein in the first position the plate extends in a vertical plane and in the second position the plate extends in a horizontal plane.

13. The system according to claim 12, wherein the plate comprises guiding surfaces on both sides thereof.

14. The system according to claim 13, wherein the plate, when in the second position, forms part of a support platform for a goods holder.

15. The system according to claim 12, wherein the plate extends into the adjacent column in the second position.

16. The system according to claim 12, wherein the plate extends into the transfer column in the second position.

17. The system according to claim 1, wherein each container handling vehicle comprises a lifting device, wherein the lifting device comprises a main part connected with lifting bands to a body of the container handling vehicle and a horizontally telescopic part comprising a gripper, and wherein the horizontal telescopic part is configured to move between a retracted position below the main part and an extended position outside a vertical projection of the main part.

18. The system according to claim 17, wherein the main part comprises stabilizing means for securing the main part in the transfer column.

19. The system according to claim 18, wherein the stabilizing means comprises fixed rollers or extendable rollers for engagement with upright members of the framework structure.

20. The system according to claim 1, wherein the obstruction member comprises friction-reducing means.

21. The system according to claim 1, further comprising:
   an additional rail system at a lower elevation than the top of the framework structure;
   a delivery vehicle with support surface operating on the additional rail system, wherein the delivery vehicle with support surface is configured to support a goods holder from below; and
   wherein the side opening opens towards the additional rail system.

22. The system according to claim 21, wherein the delivery vehicle with support surface is configured to move from the additional rail system and into the transfer column through the side opening for transferring a goods holder to, or receiving a goods holder from, a lifting device of a container handling vehicle operating on the rail system on top of the framework structure.

23. A method of transferring a goods holder through a side opening in a transfer column in an automated storage and retrieval system, the automated storage and retrieval system comprising a two-dimensional rail system comprising a first set of parallel rails arranged to guide movement of container handling vehicles in a first direction across the top of a framework structure, and a second set of parallel rails arranged perpendicular to the first set of rails to guide movement of the container handling vehicles in a second direction across the top of the framework structure which is perpendicular to the first direction, wherein a number of container handling vehicles operate on the rail system for storing and retrieving goods holders in the automated storage and retrieval system, and wherein the framework structure comprises a transfer column comprising a side opening and an adjustable blocker for obstructing the side opening, the blocker comprising a guiding surface for guiding a lifting device of a container handling vehicle vertically past the side opening; and wherein the method comprises:

moving the blocker from a first position to a second position, where, in the first position the guiding surface is positioned to guide the lifting device vertically in the transfer column and obstruct horizontal movement of a goods holder through the side opening, and, in the second position, the guiding surface is positioned not to guide the lifting device and allow horizontal movement of a goods holder through the side opening.

24. The method according to claim 23, wherein the side opening opens towards an adjacent column, and a container handling vehicle comprises a lifting device, wherein the lifting device comprises a main part connected with lifting bands to a body of the container handling vehicle and a horizontally telescopic part comprising a gripper, and wherein the horizontal telescopic part is configured to move between a retracted position below the main part and an extended position outside a vertical projection of the main part, and wherein the method comprises:

moving the telescopic part horizontally from the transfer column and through the side opening thereby moving the blocker from the first position to the second position;

transferring a goods holder to or from the adjacent column;

returning the telescopic part to the transfer column.

25. The method according to claim 23, wherein the adjacent column comprises a plurality of vertically spaced storage positions with supports for supporting goods holders, and the storage positions comprise a shifter, and wherein the method comprises:

operating the shifter for moving the blocker between the first position and the second position by moving the supports between the adjacent column and the transfer column through the side opening.

26. The method according to claim 23, wherein the system further comprises an additional rail system at a lower elevation than the top of the framework structure; a delivery vehicle with support surface operating on the additional rail system, wherein the delivery vehicle with support surface is configured to support a goods holder from below; and wherein the side opening opens towards the additional rail system, and the method comprises:

moving the delivery vehicle with support surface from the additional rail system and into the transfer column through the side opening thereby moving the blocker from the first position to the second position;

transferring a goods holder to, or receiving a goods holder from, a lifting device of one of the container handling vehicle operating on the rail system on top of the framework structure;

moving the delivery vehicles with support surface from the transfer column and to the additional rail system through the side opening such that the blocker returns to the first position.

27. The method according to claim 23, wherein the system further comprises an additional rail system at a lower elevation than the top of the framework structure; a container handling vehicle with lifting device operating on the additional rail system and wherein the side opening opens towards the additional rail system, and the method comprises:

moving the container handling vehicle from the additional rail system and into the transfer column through the side opening thereby moving the blocker from the first position to the second position;

transferring a goods holder to, or receiving a goods holder from, a position further down in the transfer column;

moving the container handling vehicle from the transfer column and to the additional rail system through the side opening such that the blocker returns to the first position.

* * * * *